United States Patent
Kollencheri Puthenveettil

(10) Patent No.: US 10,310,700 B2
(45) Date of Patent: Jun. 4, 2019

(54) APPARATUS AND METHOD FOR MANAGING OF CONTENT USING ELECTRONIC DEVICE

(71) Applicant: SAMSUNG ELECTRONICS CO., LTD., Suwon-si (KR)

(72) Inventor: Dipin Kollencheri Puthenveettil, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 15/002,508

(22) Filed: Jan. 21, 2016

(65) Prior Publication Data

US 2016/0210030 A1 Jul. 21, 2016

(30) Foreign Application Priority Data

Jan. 21, 2015 (IN) .............................. 305/CHE/2015
Oct. 12, 2015 (IN) .............................. 305/CHE/2015
Jan. 19, 2016 (KR) ........................ 10-2016-0006265

(51) Int. Cl.
*G06F 3/0481* (2013.01)
*G06F 3/0488* (2013.01)
*H04M 1/725* (2006.01)

(52) U.S. Cl.
CPC ........ *G06F 3/0481* (2013.01); *G06F 3/04817* (2013.01); *G06F 3/04883* (2013.01); *H04M 1/72522* (2013.01); *G06F 2203/04803* (2013.01); *G06F 2203/04804* (2013.01); *G06F 2203/04808* (2013.01); *H04M 1/72583* (2013.01); *H04M 2250/22* (2013.01)

(58) Field of Classification Search
CPC combination set(s) only.
See application file for complete search history.

(56) References Cited

U.S. PATENT DOCUMENTS

| | | | |
|---|---|---|---|
| 2013/0326415 A1* | 12/2013 | Park .................... | G06F 3/04817 715/835 |
| 2014/0075394 A1 | 3/2014 | Nawle et al. | |
| 2014/0137020 A1 | 5/2014 | Sharma et al. | |
| 2014/0157166 A1* | 6/2014 | Choi .................... | G06F 3/04817 715/769 |
| 2014/0258445 A1 | 9/2014 | McCoy et al. | |
| 2014/0344757 A1* | 11/2014 | Shin ..................... | G06F 3/04842 715/835 |
| 2014/0351748 A1* | 11/2014 | Xia ....................... | G06F 3/0481 715/798 |
| 2015/0169216 A1* | 6/2015 | Cho ..................... | G06F 3/04883 715/764 |
| 2015/0242086 A1* | 8/2015 | Mindlin ................ | G06F 3/0481 715/769 |
| 2016/0018982 A1* | 1/2016 | Matas ................... | G06F 3/04883 715/863 |

(Continued)

*Primary Examiner* — Hien L Duong
(74) *Attorney, Agent, or Firm* — Sughrue Mion, PLLC

(57) ABSTRACT

A method of managing content includes displaying first content executed by a first application and second content executed by a second application, receiving a user input for binding the first content to the second content, setting a relationship between the first content and the second content according to the user input, and displaying, when one of the first content and the second content is executed, presence of content bound to one of executed content.

21 Claims, 39 Drawing Sheets

(56) References Cited

U.S. PATENT DOCUMENTS

2016/0062955 A1* 3/2016 Maertens ............... H04W 4/20
  715/202
2016/0132205 A1* 5/2016 Ramakrishnan ...... G06F 3/0488
  715/765

* cited by examiner

1401

APPARATUS AND METHOD FOR MANAGING OF CONTENT USING ELECTRONIC DEVICE

CROSS-REFERENCE TO RELATED APPLICATIONS

This application claims the benefit of Indian Patent Application No. 305/CHE/2015, filed on Jan. 21, 2015, and Indian Patent Application No. 305/CHE/2015, filed on Oct. 12, 2015, in the Indian Intellectual Property Office and Korean Patent Application No. 10-2016-0006265, filed on Jan. 19, 2016, in the Korean Intellectual Property Office, the disclosures of which are incorporated herein in their entirety by reference.

BACKGROUND

1. Field

The present disclosure relates to an electronic device and method of managing content, and more particularly, to an electronic device and method of conveniently managing a plurality of pieces of bound content.

2. Description of the Related Art

Recently developed electronic devices such as smartphones, mobile tablets, computers, TVs, and calculators include enhanced central processing units (CPUs), improved graphic processors, and large memory capacity. Along with the technological improvement in the performance of the electronic devices, the electronic devices have become capable of storing and/or executing various types of content and/or memory intensive content.

SUMMARY

Provided are a method of binding a plurality of pieces of content which an electronic device includes, and a method of allowing a user to conveniently search for a plurality of pieces of bound content.

Additional aspects will be set forth in part in the description which follows and, in part, will be apparent from the description, or may be learned by practice of the presented embodiments.

According to an aspect of an embodiment, an electronic device for managing content includes a user interface configured to display first content executed by a first application and second content executed by a second application, and receive a user input for binding the first content to the second content; and a controller configured to set a relationship between the first content and the second content according to the user input. When one of the first content and the second content is executed, the user interface displays presence of content bound to one of the executed content.

According to an aspect of another embodiment, a method of managing content, performed by an electronic device, includes displaying first content executed by a first application and second content executed by a second application; receiving a user input for binding the first content to the second content; setting a relationship between the first content and the second content according to the user input; and displaying, when one of the first content and the second content is executed, presence of content bound to one of executed content.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. In this regard, the present embodiments may have different forms and should not be construed as being limited to the descriptions set forth herein. Elements and features that may be easily derived by one of ordinary skill in the art to which the present disclosure pertains based on the detailed description of the embodiments are within the spirit and scope of the present disclosure as defined by the appended claims. Expressions such as "at least one of," when preceding a list of elements, modify the entire list of elements and do not modify the individual elements of the list.

The terms "configured of" or "includes" should not be construed as necessarily including all elements or operations described in the specification. It will be understood that some elements and some operations may not be included, or additional elements or operations may be further included.

While such terms as "first," "second," etc., may be used to describe various components, such components must not be limited to the above terms. The above terms are used only to distinguish one component from another.

Throughout the specification, it will also be understood that when an element is referred to as being "connected to" another element, it can be directly connected to the other element, or electrically connected to the other element while intervening elements may also be present. Also, when a portion "includes" an element, another element may be further included, rather than excluding the existence of the other element, unless otherwise described.

In the present disclosure, content binding may be referred to as content managing. Therefore, an electronic device for managing content and a method of managing content of the electronic device may also be referred to as an electronic device of binding content and a method of binding content of the electronic device.

Embodiments below are related to an electronic device for managing content and a method of managing content of the electronic device. Features and components that are well-known to one of ordinary skill in the art to which the embodiments pertain will not be described below.

Hereinafter, the embodiments will be described with reference to the accompanying drawings.

Figure 1:
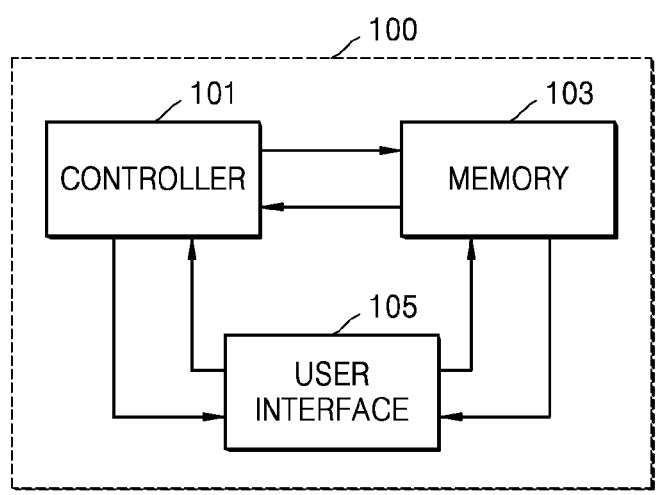
FIG. 1 is a block diagram of an electronic device for managing content, according to an embodiment.

FIG. 1 is a block diagram of an electronic device 100 for managing content, according to an embodiment. The electronic device 100 according to an embodiment may include a controller 101, a memory 103, and a user interface 105. The controller 101 according to an embodiment may drive a plurality of applications. Also, the controller 101 may execute a plurality of pieces of content. For convenience of description, described below is an embodiment in which two applications are driven and two pieces of content are executed.

The controller 101 may drive a first application and a second application, and execute first content of the first application and second content of the second application. The controller 101 may determine a relationship between the first content and the second content. The controller 101 may bind the first content to the second content based on the determined relationship between the first content and the second content. The controller 101 may determine the relationship between the first content and the second content based on a received user input. Alternatively, the controller 101 may determine the relationship between the first content and the second content based on respective content information of the first content and the second content. The content information may include information related to content. For example, the content information may include content ID, content creation date, and a content type. Operations of the controller 101 will be described more below with reference to FIGS. 3 to 8.

The content type may include all types of content that is executable by the electronic device 100. For example the content type may be any one of an image, a video, a contact number, a tax invoice, and a map.

The memory 103 according to an embodiment may include the first application, the second application, the first content, and the second content. Also, the memory 103 may include the relationship between the first content and the second content determined by the controller 101, binding information of the first content and the second content, user input information, and the respective content information of the first content and the second content. The aforementioned information may be stored in the memory 103 as database.

The user interface 105 according to an embodiment may receive a user input. Also, the user interface 105 may display at least one of the first content and the second content. In the present disclosure, the user input may include gestures, For example, the user input may include touching, tapping, tapping and dragging, swiping, and pinching.

Operations of the user interface 105 will be described with reference to FIG. 2, FIGS. 10 to 16 and FIGS. 18 to 26.

Figure 2A:
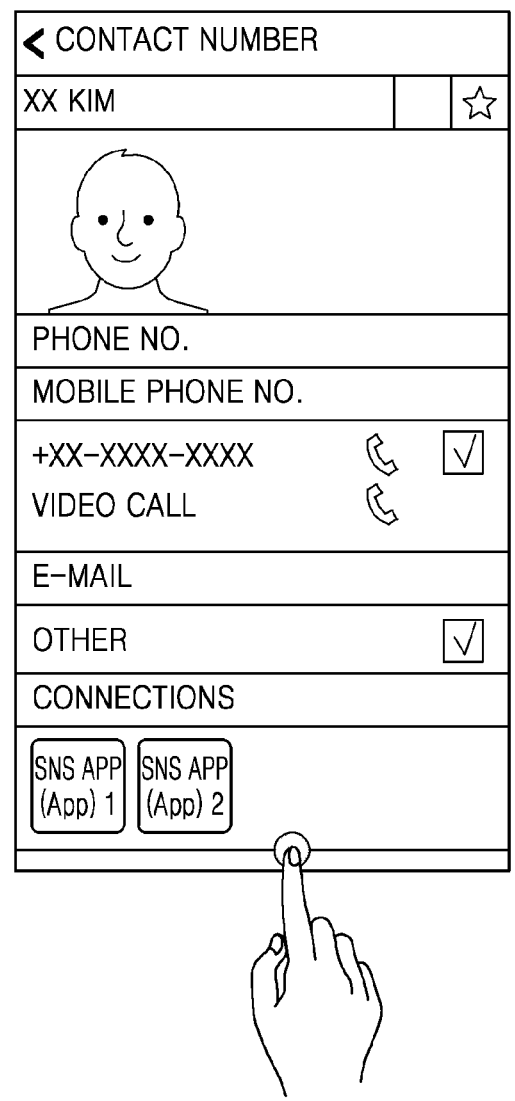
FIGS. 2A and 2B are examples of an electronic device displaying bound first content and second content, according to an embodiment.
Figure 2B:
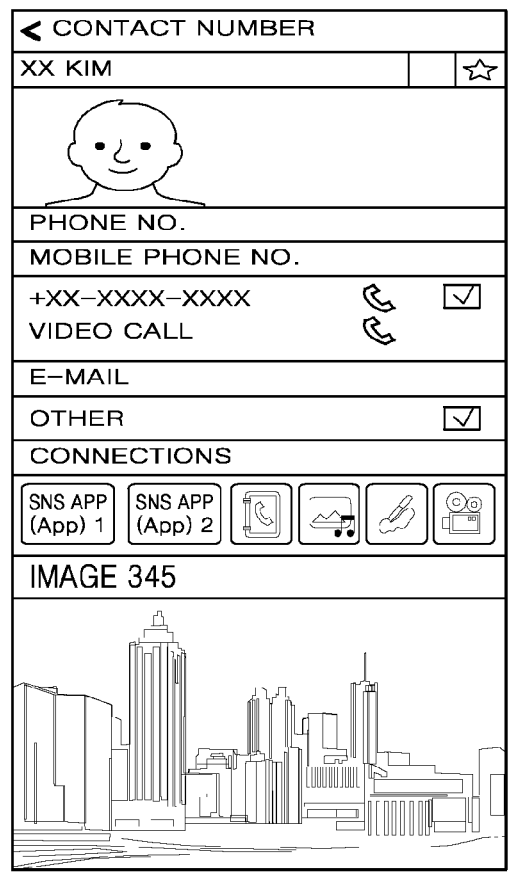

FIGS. 2A and 2B are examples of the electronic device 100 displaying bound first content and second content, according to an embodiment.

Referring to FIG. 2A, the user interface 105 of the electronic device 100 may display the first content. Referring to FIG. 2B, the user interface 105 of the electronic device 100 may display the first content and the second content. The first content and the second content may be executed by the first application and the second application, respectively.

In an embodiment, the first application may be a phonebook application, and the second application may be a gallery application. Therefore, the first content may include contact number information of 'XX KIM', and the second content may include image information of 'image 345.'

In particular, referring to FIG. 2A, the user interface 105 of the electronic device 100 may display an image for executing content binding on the first content. According to an embodiment, the image for executing content binding may be displayed as a line at a bottom of a content screen that is current displayed as shown in FIG. 2A. The user interface 105 of the electronic device 100 may receive a user input via the displayed line.

According to an embodiment, the controller 101 of the electronic device 100 may perform content binding based on the user input that is input via the user interface 105. The controller 101 may perform the content binding by itself or by using an application. Also, the content binding may be performed by driving a framework. According to the present disclosure, a framework that performs the content binding may be referred to as a content binding framework (CB FW).

The CB FW may be executed in the controller 101. Hereinafter, operations of the CB FW may be understood as operations of the controller 101. Also, the operations of the CB FW may be understood as operations that are independently or dependently performed in the controller 101.

Described below is an embodiment in which the content binding is performed by the CB FW.

Referring to FIG. 2B, when the CB FW for driving the content binding is driven, a screen area displaying the first content may be reduced in size to create an area for displaying the second content. On a portion of the screen area displaying the first content, at least one application that executes content bound to the first content may be displayed.

A user may select one application icon from the at least one application icon 1302. According to an embodiment, the controller 101 may drive a second application that corresponds to the selected application icon. Then, the second application may execute the second content that is bound to the first content. As a result, the second content that is bound to the first content may be displayed on an area created in the user interface 105 of the electronic device 100.

Hereinafter, a content binding method will be described. According to an embodiment, there are two types of content binding methods. The content binding method may be classified as a first binding method and a second binding method according to a content binding structure.

The first binding method may be referred to as 'nested binding.'

The second binding method may be referred to as 'group binding.'

Content binding structures and the first and second binding methods according to the content binding structures will be described below with reference to FIGS. 9A and 9B.

Figure 3:
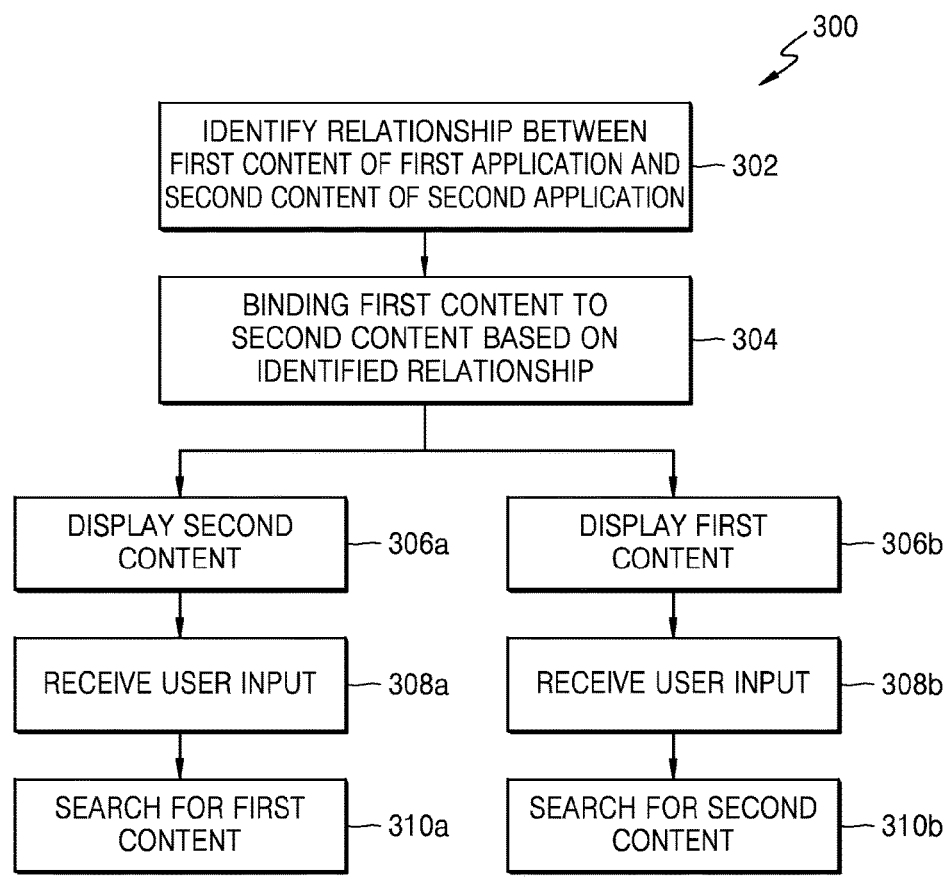
FIG. 3 is a flowchart of a method of binding content and searching for bound content, performed by an electronic device, according to an embodiment.

FIG. 3 is a flowchart of a method 300 of binding content and searching for bound content, performed by an electronic device, according to an embodiment. In particular, FIG. 3 shows a method of searching for bound content. The controller 101 may identify a relationship between the first content of the first application and the second content of the second application (operation 302). The relationship between the first content and the second content may be determined based on the respective content information of the first content and the second content. The respective content information of the first content and the second content may include content ID, and a content type.

Next, the controller 101 may bind the first content to the second content based on the identified relationship (operation 304).

Next, the controller 101 may display the second content (operation 306a) or display the first content (operation 306b) on the user interface 105.

After operation 306a, the controller 101 may receive a user input (operation 308a). The user input may be input via the user interface 105. Therefore, the controller 101 may receive the user input via the user interface 105. The received user input may be for selecting an application icon of content bound to the second content. Then, the controller 101 may search for the first content that is bound to the second content (operation 310a).

After operation 306b, the controller 101 may receive a user input (operation 308b). Next, the controller 101 may search for the second content that is bound to the first content (operation 310b). Operations 308b and 310b are the same as the aforementioned operations 308a and 310a.

Figure 4:
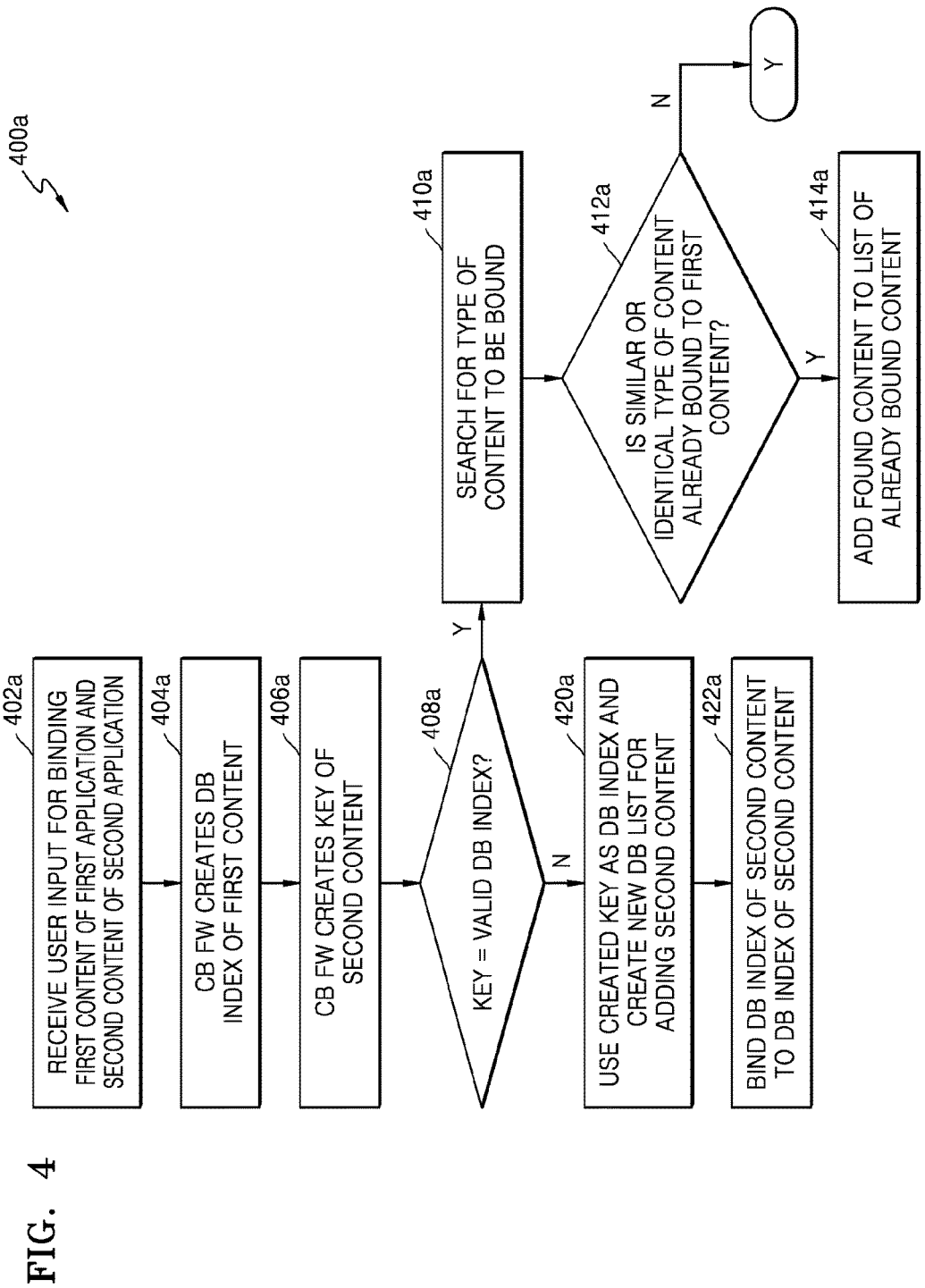
FIGS. 4 and 5 are flowcharts of a method of binding content, according to an embodiment.
Figure 5:
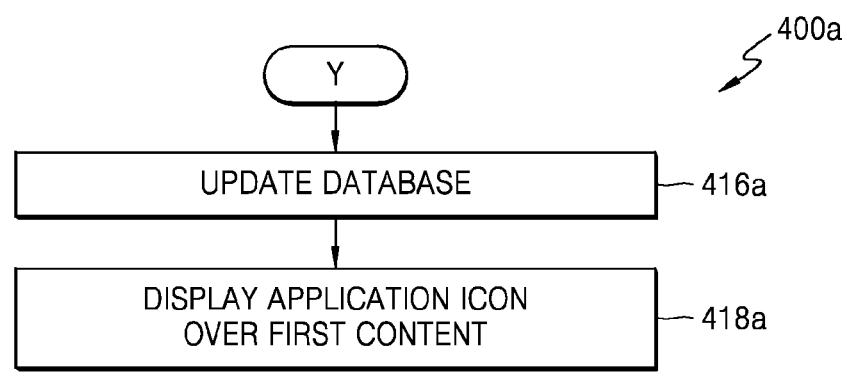

FIGS. 4 and 5 are flowcharts of a method 400a of binding content, according to an embodiment.

From the user interface 105, the controller 101 may receive a user input for binding the first content of the first application and the second content of the second application (operation 402a). The controller 101 may receive the user input for binding the first content to the second content and execute the CB FW.

The CB FW may create a database (DB) index of the first content (operation 404a). Also, the CB FW may create a first DB list that includes the DB index of the first content.

The CB FW may create a key of the second content (operation 406a).

A DB index of content may be created when content binding has been performed. Also, the DB index of the content may be created when binding is performed for the first time on the content. However, a key of the content may be created to perform content binding. The DB index and the key of the content may be created based on information of the content.

The DB index and the key of the content both include information that is necessary for identifying a relationship between a plurality of pieces of content.

According to an embodiment, the key of the content may be expressed as below:

Key=$F$(content ID, content type)

According to an embodiment, the DB index of the content may be expressed in the same manner as the key of the content. That is, the DB index may be expressed as 'DB index=$F$(content ID, content type).'

Next, the controller 101 may determine whether 'Key=Valid DB index' is satisfied (operation 408a). In particular, the controller 101 may identify whether a key of the second content is the same as a DB index of the first content.

When 'Key≠Valid DB index,' a new DB list to which the second content is added may be created by using the created key as a DB index (operation 420a). 'Valid DB index' may indicate a DB index that is created in advance by using a content binding method according to an embodiment. According to an embodiment, the DB index created in advance may be the DB index of the first content. As described above, after being stored in the DB list, the key of the second content may be referred to as a DB index of the second content.

The DB index of the bound second content may be bound to the DB index of the first content (operation 422a). In particular, the DB index of the second content may be added to the first DB list. As a result of binding of the first content and the second content, the first DB list may include the DB index of the first content and the DB index of the second content.

Alternatively, when 'Key=Valid DB index' is satisfied, a type of content to be bound (operation 410a). In particular, the key of the second content being the same as the DB index of the first content indicates that the first content is already bound to the second content. Therefore, the CB FW may search for third content to be bound to the first content. In particular, the CB FW may search for a type of the third content that is to be bound to the first content.

Then, the CB FW may identify whether the first content is already bound to the same or similar type of content as the third content (operation 412a).

When the first content is already bound to the same or similar type of content as the third content, the CB FW may add the third content to the first DB list (operation 414a).

When the first content or the second content is not bound to the content with the same or similar type as the third content, operations shown in the flowchart of FIG. 5 are performed.

Referring to FIG. 5, when the first content is already bound to the content with the same or similar type as the third content, the CB FW may update database (operation 416a). In particular, the type of the third content may be stored in the database. Also, a DB index of the third content may be added to the first DB list.

An application icon may be displayed over the first content (operation 418a). In particular, the application icon displayed over the first content may be an icon of an application that is bound to the first content. That is, the application icon displayed over the first content may include an application icon of the second content and an application icon of the third content.

Figure 6:
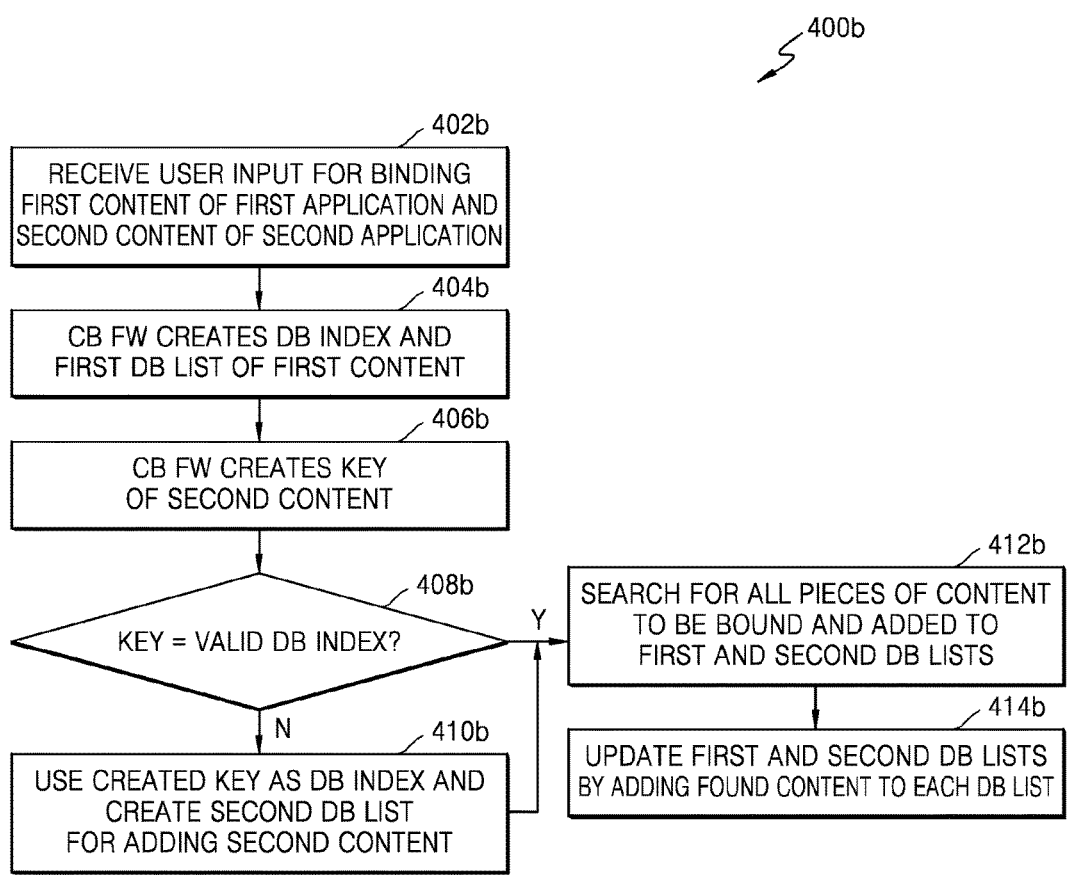
FIG. 6 is a flowchart of a method of binding content, according to an embodiment.

FIG. 6 is a flowchart of a method 400b of binding content, according to an embodiment.

The controller 101 may receive a user input for binding the first content of the first application and the second content of the second application (operation 402b). Then, the controller 101 may execute the CB FW to perform content binding.

Next, the CB FW may create a DB index of the first content and a first DB list of the first content (operation 404b).

Next, the CB FW may create a key of the second content (operation 406b).

The controller 101 may determine whether 'Key=Valid DB index' is satisfied (operation 408b).

Since operations 402b to 408b are the same as the aforementioned operations 402a to 408a, description of operations 402b to 408b will be omitted.

When 'Key=Valid DB index' is satisfied, the CB FW may use the created key as a DB index and thus create a second DB list to add the second content (operation 410b). In particular, the key of the second content may correspond to a DB index of the second content. The second DB list may include the DB index of the second content.

When 'Key=Valid DB index' is satisfied, operations 412b to 414b may be sequentially performed after operation 410b.

When 'Key≠Valid DB index,' the CB FW may search for all pieces of content to be added to the first or second DB list and bound (operation 412b). In particular, the CB FW may search for all pieces of content which are bound to the first content or the second content.

The CB FW may update the first and second DB lists by adding the found content to each of the first and second DB lists (operation 414b). In particular, the CB FW may create DB indexes of the found content. Thereafter, the CB FW may add the created DB indexes to the first and second DB lists.

Figure 7:
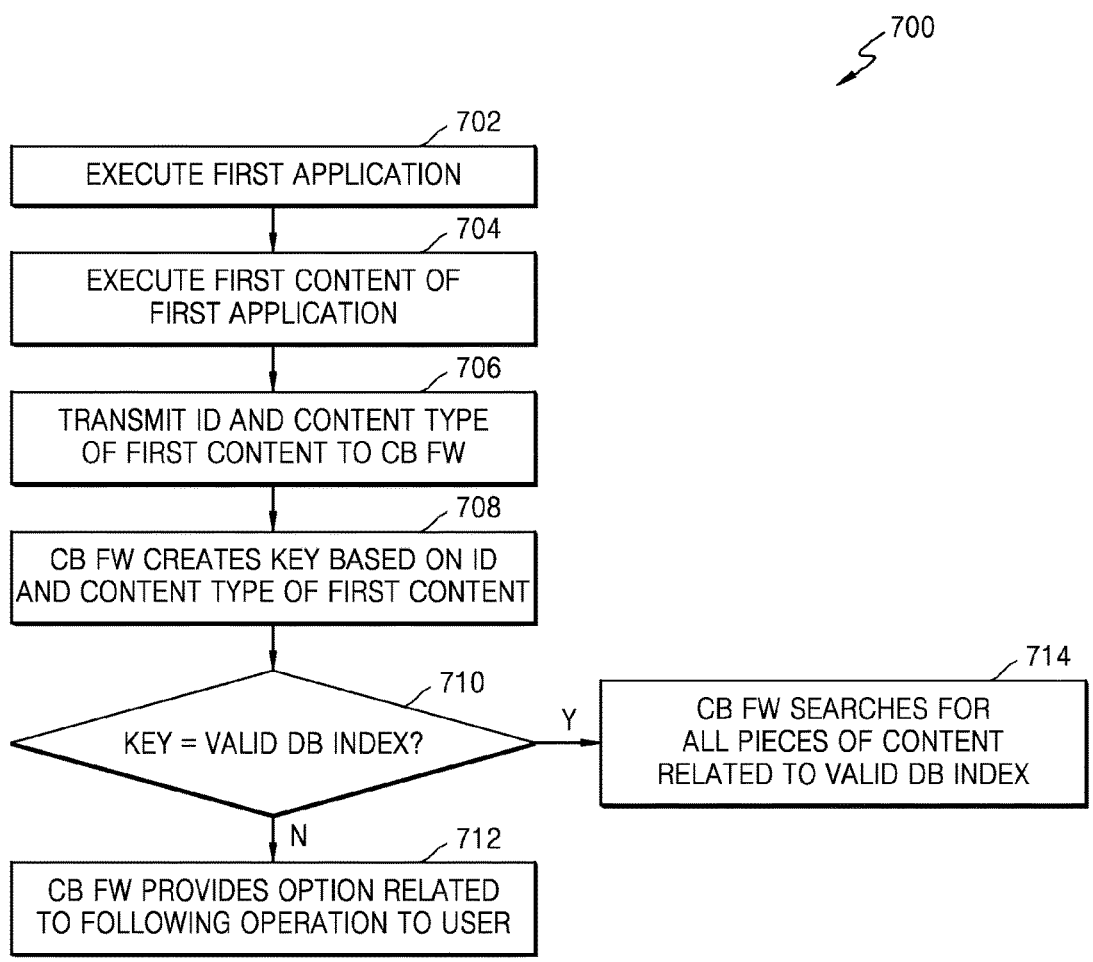
FIG. 7 is a flowchart of a method of binding content, according to an embodiment.

FIG. 7 is a flowchart of a method 700 of binding content, according to an embodiment.

In particular, FIG. 7 is a flowchart of a method of searching for bound content.

According to an embodiment, the controller 101 may execute the first application (operation 702). The controller 101 may execute the first content of the first application (operation 704). The controller 101 may transmit an ID and a content type of the first content to the CB FW (operation 706). That is, the controller 101 may transmit content information about the first content to the CB FW.

The CB FW may create a key of the first content based on the ID and content type of the first content (operation 708).

Then, the controller 101 may determine whether the created key of the first content corresponds to a valid DB index (operation 710).

When 'Key≠Valid DB index,' the CB FW may provide an option related to the following operation to the user (operation 712). In particular, 'Key≠Valid DB index' may indicate that there is no valid DB index that corresponds to the key of the first content. When there is no valid DB index that corresponds to the key of the first content, there may be no content that is bound to the first content. Therefore, the CB FW may search for the second content to be bound to the first content or bind the first content to the second content.

Alternatively, when 'Key=Valid DB index' is satisfied, the CB FW may search for all pieces of content that is bound to the valid DB index (operation 714). In particular, the CB FW may search for all pieces of content that is bound to the first content.

Figure 8:
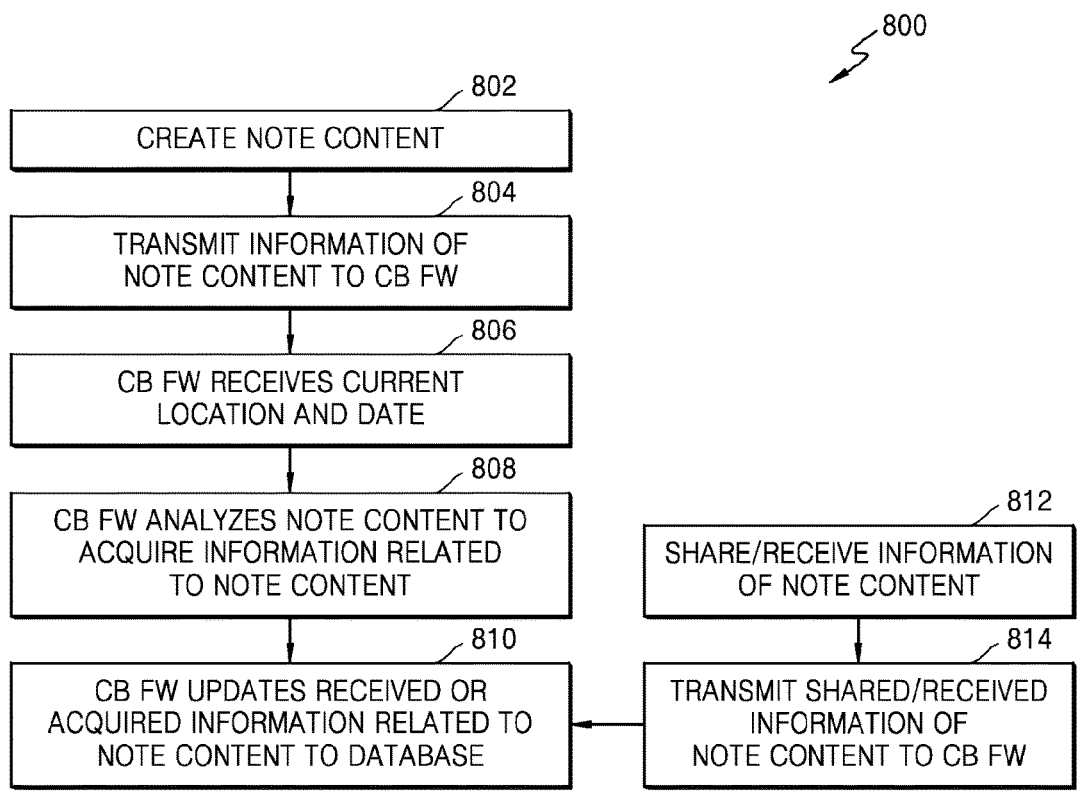
FIG. 8 is a flowchart of a method of binding content, according to an embodiment.

FIG. 8 is a flowchart of a method 800 of binding content, according to an embodiment.

In particular, FIG. 8 is a flowchart of a content binding method in the case that the first application is a note application and the first content is note content.

Operations 802 to 810 are performed by the CB FW when the note content is newly created.

Operations 810, 812, and 814 are performed by the CB FW when there is pre-created note content.

First, described below are operations performed by the CB FW when the note content is newly created.

The controller 101 may create the note content (operation 802).

Then, the controller 101 may execute the CB FW to bind the content.

Next, the controller 101 may transmit information of the note content to the CB FW (operation 804).

The CB FW may receive a current location and date (operation 806).

The CB FW may analyze the note content to acquire information related to the note content (operation 808).

The CB FW may update the received or acquired information related to the note content to a database (operation 810).

Described below are operations performed by the CB FW when there is pre-created note content.

The controller 101 may share/receive note content (operation 812).

Next, the controller 101 may transmit information of the shared/received note content to the CB FW (operation 814).

Then, the CB FW may update the received or acquired information related to the note content to the database (operation 810).

Figure 9A:
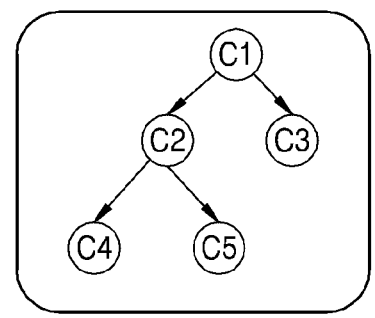
FIGS. 9A and 9B are conceptual diagrams visually illustrating a binding structure between a plurality of pieces of bound content, according to an embodiment.
Figure 9B:
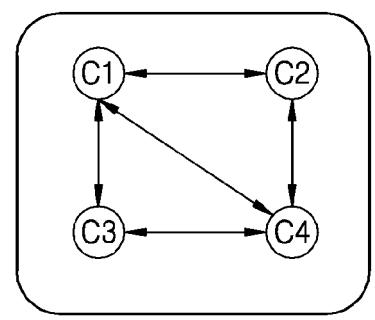

FIGS. 9A and 9B are conceptual diagrams visually illustrating a binding structure between a plurality of pieces of bound content, according to an embodiment.

Referring to FIGS. 9A and 9B, each piece of the bound content may be shown as C1, C2, C3, C4, and C5. Also, a binding structure between the pieces of bound content may be shown by using arrows.

FIG. 9A shows that the binding structure between the pieces of bound content is nested binding. FIG. 9B shows that the binding structure between the pieces of bound content is group binding.

Referring to FIG. 9A, C1 is content that is bound to C2 and C3. Likewise, C2 is content that is bound to C4 and C5.

Referring to FIG. 9B, C1, C2, C3, and C4 are pieces of content that are bound to one another.

According to the binding structure of the pieces of content, the user interface 105 may differently display found bound content. In particular, in the case of nested binding, the user interface 105 may display a screen as shown in FIGS. 2A, 2B, 14A to 14F, 15A, and 15B.

In particular, in the case of group binding, the user interface 105 may display a screen as shown in FIGS. 16A to 16C, 22A, and 22B.

Figure 10A:
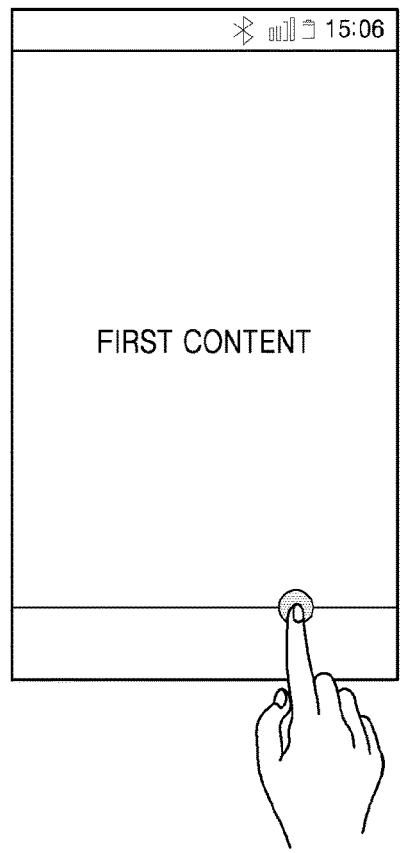
FIGS. 10A and 10B are diagrams for describing an electronic device searching for second content that is bound to first content, according to an embodiment.
Figure 10B:
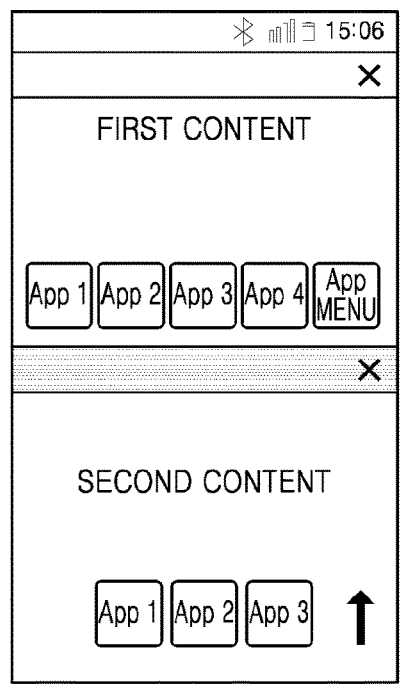

FIGS. 10A and 10B are diagrams for describing the electronic device 100 searching for the second content that is bound to the first content, according to an embodiment.

In particular, FIGS. 10A and 10B show screens of nested binding.

Referring to FIG. 10A, the user interface 105 according to an embodiment may display the first content and a line image for driving the CB FW. The controller 101 may receive a user input that is input via the user interface 105 and drive the CB FW.

Referring to FIG. 10B, the user interface 105 according to an embodiment may display a screen showing that the CB FW is executed according to the user input. When the CB FW is executed, the screen of the user interface 105 may be divided. In particular, an area for showing the first content may be reduced and an area for showing the second content may be created. As shown in FIG. 10B, the user interface 105 may be horizontally divided, but is not limited thereto. According to an embodiment, the screen of the user interface 105 may be divided vertically or diagonally, or display two or more pieces of content.

As shown in FIG. 10B, the first content and the second content may be displayed on the horizontally divided screen of the user interface 105. Hereinafter, an upper area of the divided screen of the user interface 105 will be referred to as a first area, and a lower area thereof will be referred to as a second area. The first content may be displayed on the first area. A bar at an upper portion of the first area indicates that the CB FW is being driven. The user may select an 'X' shown on the bar in the first area. Then, the second content in the second area may be displayed on the first area and the second area. That is, the second content may be displayed on the entire screen of the user interface 105.

Icons of applications that may execute content to be bound to the first content may be at a lower portion of the first area. An application menu icon furthest to the right among the icons shown in the first area. The user may select one of the icons shown in the first area. The user may select the application menu icon. In this case, an application icon other than the icons currently shown in the first area may appear. Then, the user may select an icon from among the application icons shown in the first area. The user may select an icon to search for the second content to be bound to the first content. An application that corresponds to the selected icon may be the second application.

Thereafter, the second content of the second application may be displayed on the second area. The user may select 'X' at a right side of a bar at an upper portion of the second area, and thus finish execution of the second content shown on the second area. Also, when the user selects 'X' at the right side of the bar at the upper portion of the second area, the screen of the user interface 105 may transfer to the screen of FIG. 10A.

Icons of applications that may execute content bound to the second content may be at a lower portion of the second area. The user may select an arrow furthest to the right in the second area, and thus search for third content to be bound to the second content. Icons of applications that may execute content that is to be bound to the second content may be at a lower portion of the second area. When the user selects the arrow furthest to the right in the second area, although not illustrated, an application menu icon may be additionally shown at a rightmost side of the icons shown in the second area. The user may select one of the icons shown in the second area. The user may select the application menu icon. In this case, an application icon other than the icons currently shown in the second area may appear. Then, the user may select an icon from among the application icons shown in the second area. The user may select an icon to search for the third content to be bound to the second content. An application that corresponds to the selected icon may be a third application.

FIGS. 11A to 11D are exemplary diagrams of a user input for binding the first content to the second content, according to an embodiment.

Figure 11A:
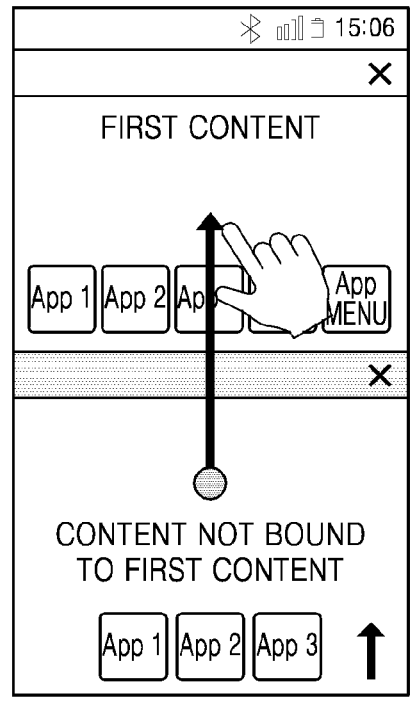
FIGS. 11A to 11D are exemplary diagrams of a user input for binding first content to second content, according to an embodiment.

FIGS. 11A to 11D show embodiments of performing the content binding method. Screen configuration of the user interface 105 shown in FIGS. 11A to 11D are the same as that of FIGS. 10A to 10B, and thus, description thereof will be omitted. FIG. 11A show a user input (user gesture) for binding content, according to an embodiment. In particular, the user may tap and drag or swipe from the second area to the first area. In this case, the second content shown in the second area is content that is not bound to the first content.

FIG. 11A is an example of a user input for binding the first content to the second content. The user input may be an operation of tapping and dragging or swiping from the second area showing the second content that is not bound to the first content to the first area showing the first content. In particular, the user may place a fingertip on a random point of the second area of the screen of the user interface 105, and while touching the screen with the fingertip, the user may move the fingertip to a random point in the first area. When two pieces of content are bound in this manner, a relationship between the first content and the second content may be nested binding.

Figure 11B:
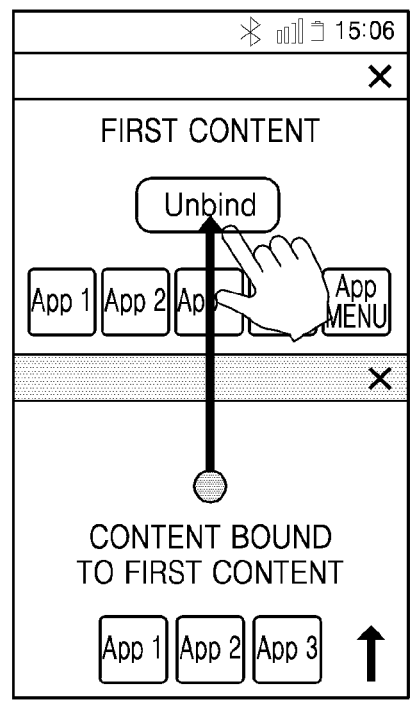

FIG. 11B shows a user input (user gesture) for content unbinding according to an embodiment. In particular, the user may tap and drag or swipe from the second area to the first area. In this case, the second content shown in the second area is bound to the first content. That is, even when the same user input of tapping and dragging or swiping is input, depending on whether the first content is bound to the second content, the first content may be bound to or unbound from the second content. When the first content is unbound from the second content, an 'Unbind' message may be displayed on the first area to indicate that the first content is unbound from the second content.

Figure 11C:
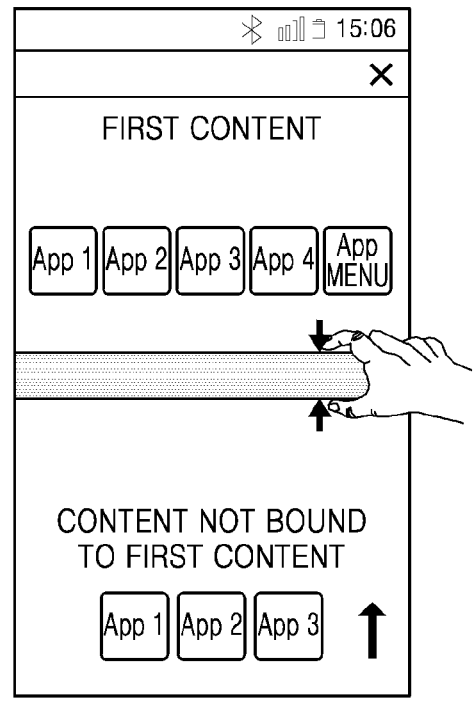

FIG. 11C is another example of the user input for binding the first content to the second content. In particular, the user input may be simultaneously pinching the first and second areas.

In particular, the user may place a fingertip at a random point in the first area of the screen of the user interface 105, and at the same time, place a fingertip at a random point in the second area of the screen of the user interface 105. Then, while touching the screen with the two fingertips, the user may move the two fingertips to random points between the first and second areas.

The exemplary user input shown in FIG. 11C may be for group binding.

Figure 11D:
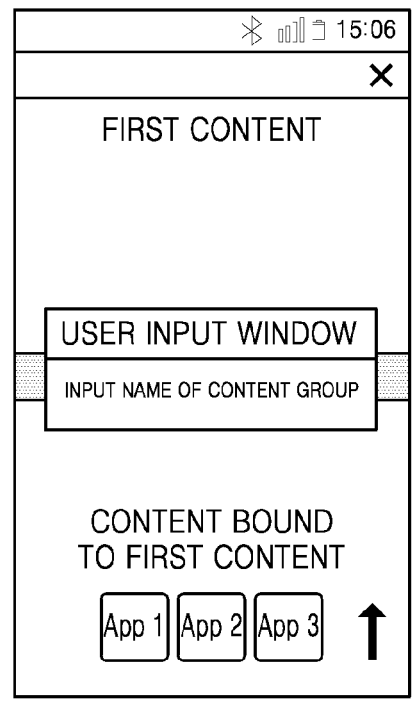

FIG. 11D shows a screen for providing a user input window for naming a bound content group, according to an embodiment.

The bound content group may be named according to a name input by the user via the user input window. Alternatively, the bound content group may be automatically named according to a random name.

Figure 12A:
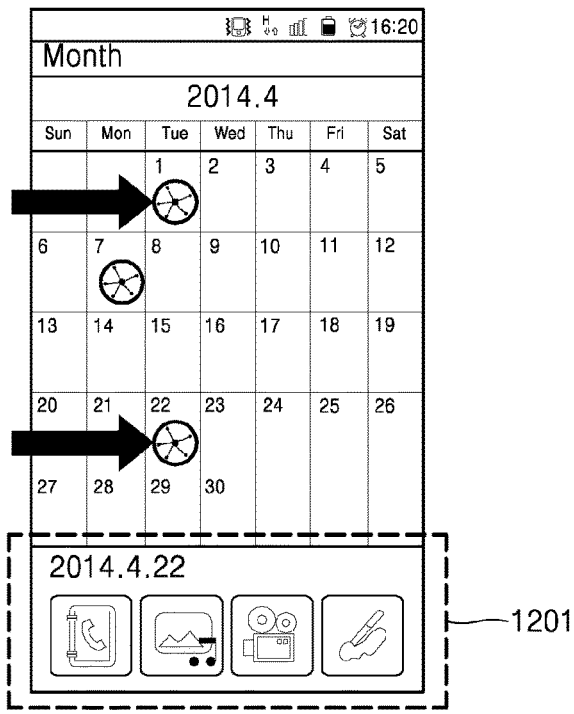
FIGS. 12A and 12B are diagrams of a screen of a user interface displaying content to which a content binding method is applied, according to an embodiment.
Figure 12B:
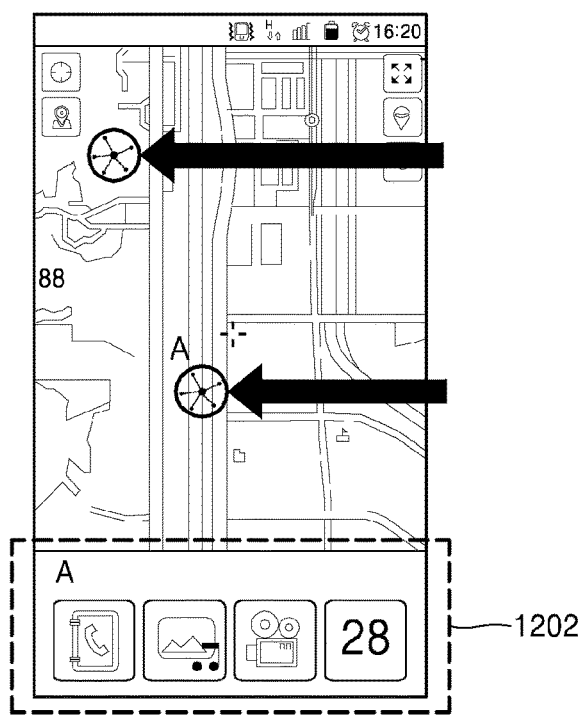

FIGS. 12A and 12B are diagrams of a screen of a user interface displaying content to which the content binding method is applied, according to an embodiment.

FIG. 12A is a screen of a calendar application. In particular, the calendar application may execute content that includes calendar information of April 2014. FIG. 12B shows a screen of a map application. In particular, the map application may execute content that includes map information of a certain region.

Referring to FIGS. 12A and 12B, images indicating the presence of content that is bound to each piece of content (shown with arrows on FIGS. 12A and 12B) on a screen displaying the content including the calendar information of April 2014 or the content including the map information of the certain region.

Referring to FIG. 12A, an image indicating a date and the presence of bound content may be displayed on areas of Apr. 1, 2014, Apr. 7, 2014, and Apr. 22, 2014. The user may select an image indicating the presence of bound content shown at Apr. 22, 2014. As a result, icons 1201 of applications that execute content bound to date content of 'Apr. 22, 2014' may be displayed at a lower portion of the screen. In particular, the icons 1201 of the applications that execute the content bound to the date content of 'Apr. 22, 2014' may include a phonebook application icon, a music playing application icon, a video playing application icon, a memo application icon, etc.

Referring to FIG. 12B, images indicating the present of content bound to content including information of a certain location may be displayed. In particular, the user may select an image indicating the presence of bound content shown on an area that marks a location A. As a result, icons 1202 of applications that execute content bound to content of the location A may be displayed at a lower portion of the screen. In particular, the icons 1202 of the applications that execute the content bound to the content of the location A may include a phonebook application icon, a music playing application icon, a video playing application icon, a calendar application icon, etc.

Figure 13A:
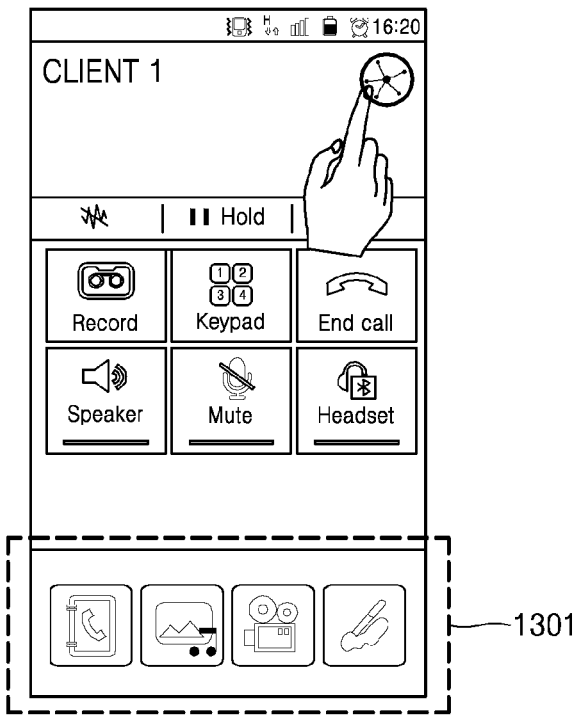
FIGS. 13A and 13B are exemplary diagrams of a user input for displaying bound content, according to an embodiment.
Figure 13B:
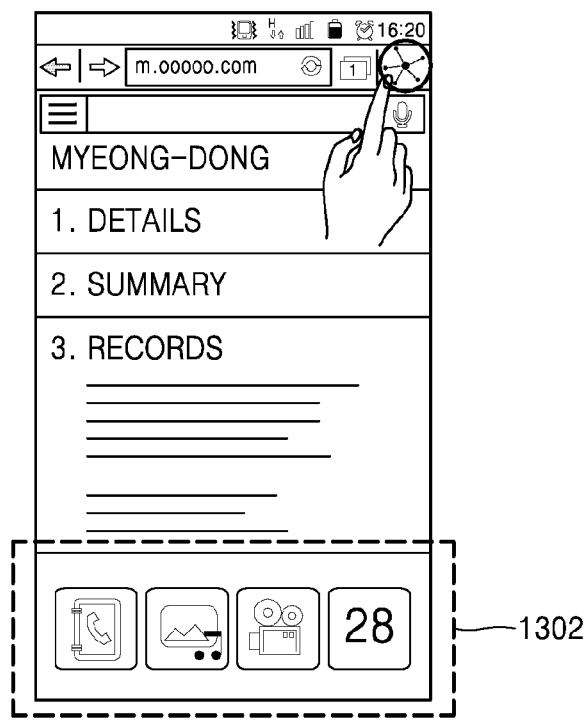

FIGS. 13A and 13B are exemplary diagrams of a user input for displaying bound content, according to an embodiment.

FIG. 13A shows a screen of a phone application. In particular, FIG. 13A shows a screen of a user interface when the user is calling a client 1 with the phone application. According to an embodiment, the user may search for content that is bound to the client 1 while calling the client 1. In particular, the user may search for content that is bound to contact number content of the client 1. In addition, while the user is calling the client 1, the user may select an image indicating the presence of bound content shown at an upper end of the user interface 105. Based on the user's selection, icons 1301 of applications that execute content that is bound to the client 1 may be displayed at a lower portion of the screen of the user interface 105. According to an embodiment, the content bound to the client 1 may include e-mails, documents, images, etc. that have been transmitted and received between the client 1 and the user for a certain period.

FIG. 13B shows a screen of a web browser application. In particular, FIG. 13B shows a wiki page of "Myeong-dong" that is loaded by the user. As in FIG. 13A, the user may select an image indicating the presence of bound content displayed at an upper end of the user interface 105. Based on the user's selection, icons 1302 of applications that execute content that is bound to "Myeong-dong" at a lower portion of the user interface 105. According to an embodiment, the content bound to "Myeong-dong" may be found and bound based on a semantic analysis result. According to an embodiment, the content bound to "Myeong-dong" may include tickets, travel plans, contact numbers, etc.

FIGS. 14A to 14F are exemplary diagrams of a user input for displaying bound content, according to an embodiment.

In particular, FIGS. 14A to 14F illustrate a series of processes for searching for a plurality of pieces of content that are bound to contact number content.

Figure 14A:
FIGS. 14A to 14F are exemplary diagrams of a user input for displaying bound content, according to an embodiment.

Referring to FIG. 14A, the user interface 105 may display contact number content of 'XX KIM.'

Figure 14B:

Referring to FIG. 14B, the user interface 105 may display contact number information of 'XX KIM' as in FIG. 14A. Also, the user interface 105 may display an image for searching for bound content at a lower portion. According to an embodiment, the image for searching for the bound content may be a line at a lower portion of a currently displayed screen of content as shown in FIG. 2B. The user may touch a portion (e.g., an area marked by an arrow) of the line at the lower portion of the screen, or drag and swipe the entire line at the lower portion of the screen. The search for the bound content may start according to touching or dragging and swiping of the user.

Figure 14C:
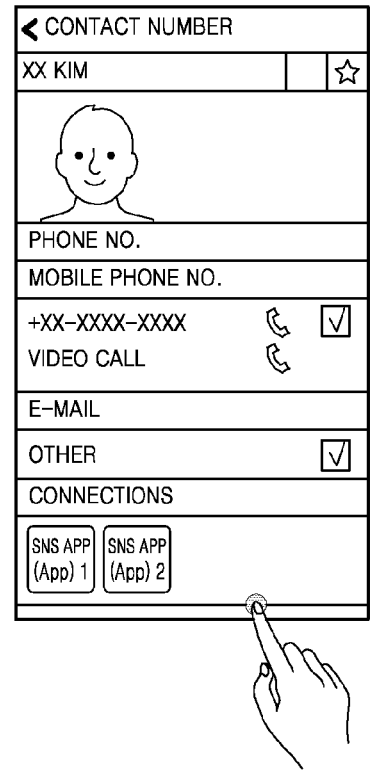

Referring to FIG. 14C, the user may initiate searching of the bound content by touching a portion of the line at the lower portion of the screen.

Figure 14D:
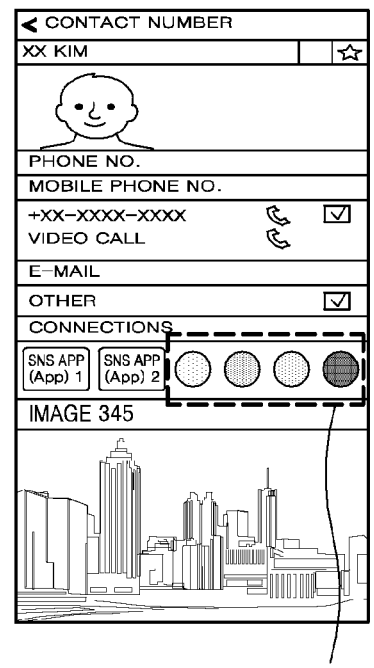

Referring to FIG. 14D, when the user initiates the searching of the bound content, the screen of the user interface 105 may be divided horizontally. Screen division has been described above with reference to FIGS. 2A and 2B. An upper area (first area) of the screen of the user interface 105 may show a size-reduced version of the contact number content. Also, images of applications that execute content bound to the contact number contact of 'XX KIM' may be shown as icons 1401 at a lower right end of the first area of the user interface 105.

A lower area (second area) of the screen of the user interface 105 may display 'image 345' content that is bound to the contact number content of 'XX KIM.' According to an embodiment, the 'image 345' content may be default bound content of the contact number content of 'XX KIM.' The default bound content is content that is displayed as a default in a second area when a screen is divided into a first area and the second area to search for content (second content) that is bound to first content.

Figure 14E:
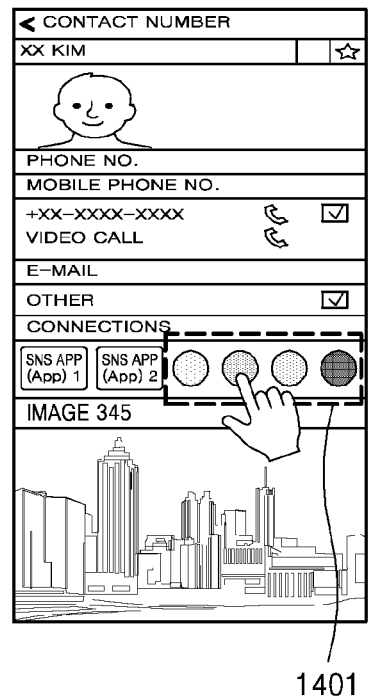

Referring to FIG. 14E, the user may select an icon of a video playing application from among the icons 1401 that execute the applications of the content bound to the contact number content of 'XX KIM.' When the user selects the icon of the video playing application, the video playing application is executed.

Figure 14F:
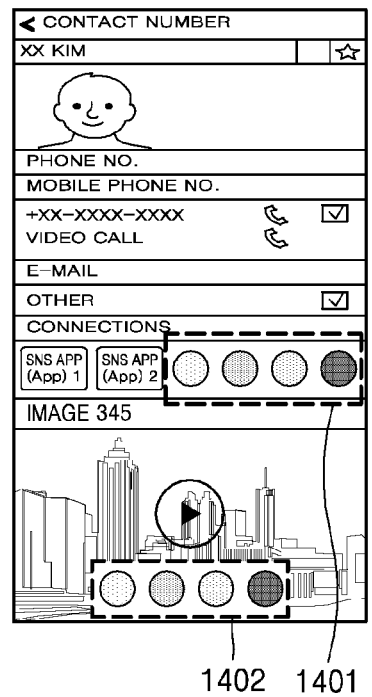

Next, referring to FIG. 14F, video content that is bound to the contact number content of the 'XX KIM' may be displayed in the second area. Also, the second area may display icons 1402 of applications that execute content that is bound to the video content. Then, searching of the content bound to the video content may be performed in the same manner as processes of searching for the video content from the contact number content.

Figure 15A:
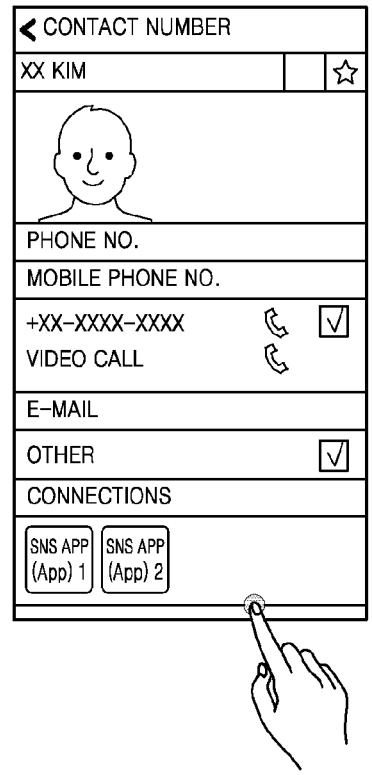
FIGS. 15A and 15B are exemplary diagrams of a user input for displaying bound content, according to an embodiment.
Figure 15B:
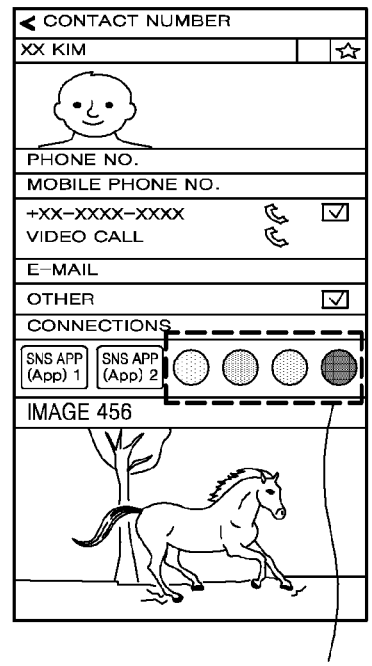

FIGS. 15A and 15B are exemplary diagrams of a user input for displaying bound content, according to an embodiment. In particular, FIGS. 15A and 15B illustrate an example in which there is only one image content bound to contact number content.

Description of FIG. 15A is omitted because FIG. 15A is the same as FIG. 14C.

Referring to FIG. 15B, when the user initiates a bound content search, the icons 1401 that execute the applications of the content bound to the contact number content of 'XX KIM' may be displayed. The user may select an icon of a gallery application from among the icons 1401. As a result, the second area may display 'image 456,' which is the only image content that is bound to the contact number content of 'XX KIM.' In an embodiment shown in FIGS. 16A to 16C, a plurality of pieces of image content are bound to contact number content.

Figure 16A:
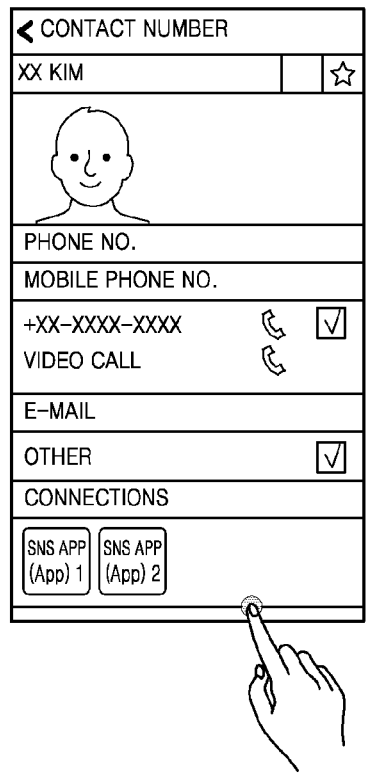
FIGS. 16A to 16C are exemplary diagrams of a user input for displaying bound content, according to an embodiment.
Figure 16B:
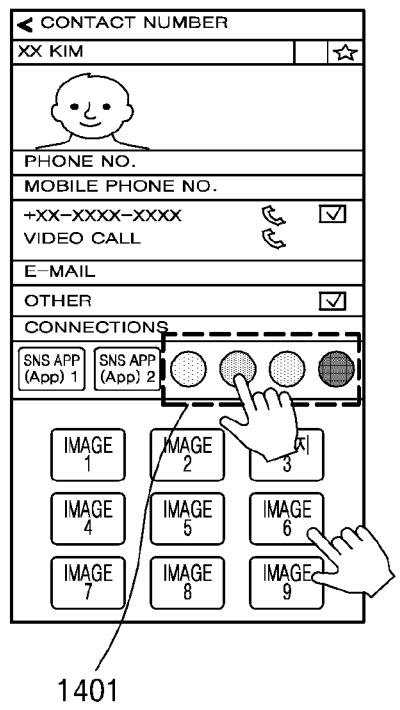
Figure 16C:
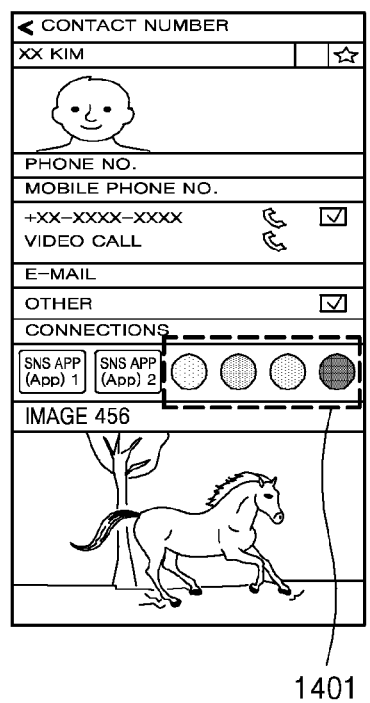

FIGS. 16A to 16C are exemplary diagrams of a user input for displaying bound content, according to an embodiment.

In particular, unlike FIGS. 15A and 15B, FIGS. 16A to 16C show an embodiment in which a plurality of pieces of image content are bound to contact number content.

Description of FIG. 16A is omitted because FIG. 16A is the same as FIGS. 14C and 15A.

Referring to FIG. 16B, when the user initiates a bound content search, the icons 1401 that execute the applications of the content bound to the contact number content of 'XX KIM' may be displayed. The user may select an icon of a gallery application from among the icons 1401. As a result, the second area may display a plurality of pieces of image content (images 1 to 9) that are bound to the contact number content of 'XX KIM' as thumbnail images. The user may select a thumbnail image 'image 6' that corresponds to 'image 456' content.

Referring to FIG. 16C, when the user selects the thumbnail image 'image 6' that corresponds to the 'image 456' content, the 'image 456' content may be displayed on the second area.

Figure 17:
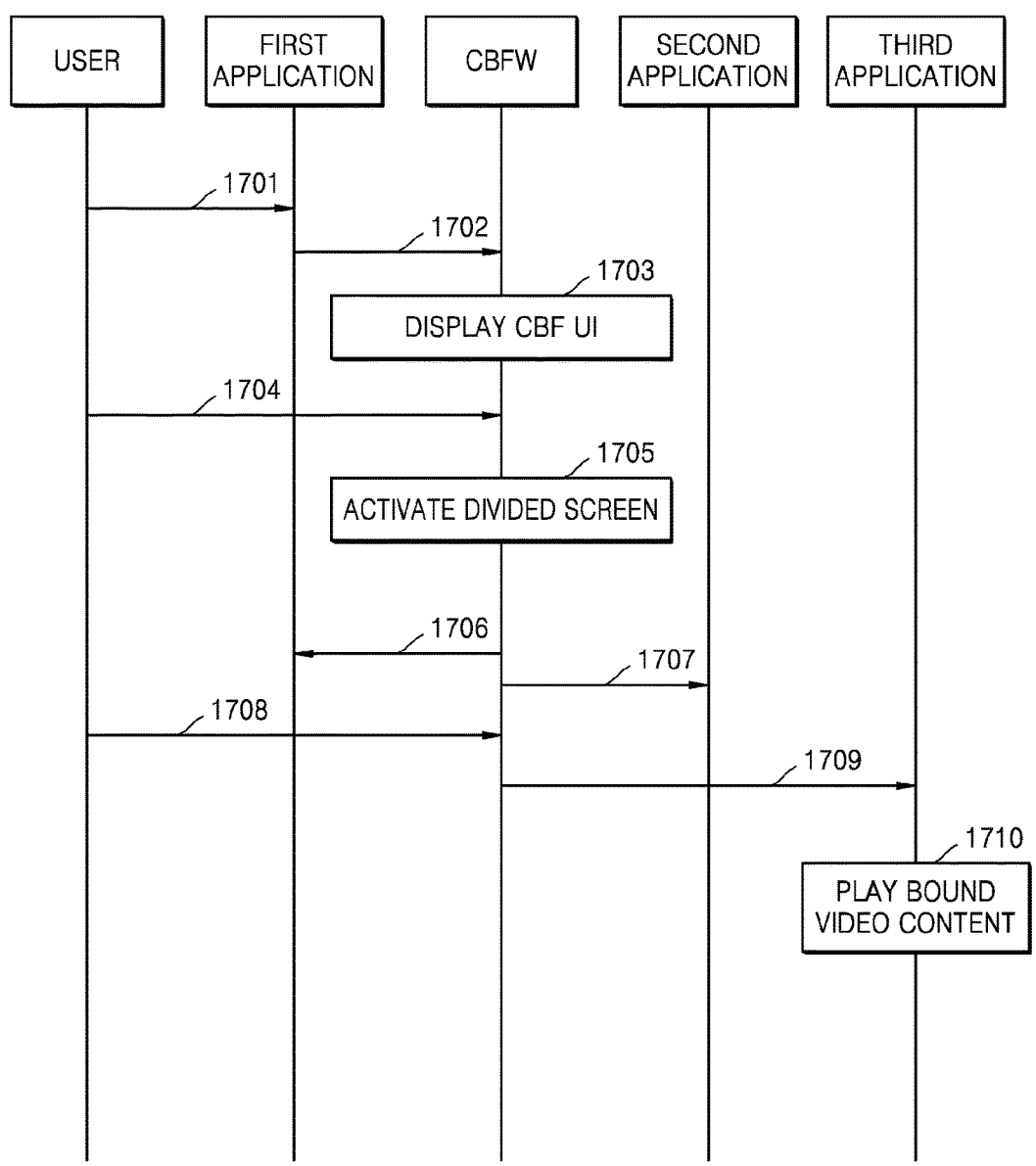
FIG. 17 is a flowchart of a method of searching for bound content described with reference to FIGS. 14A to 14F.

FIG. 17 is a flowchart of a method of searching for bound content described with reference to FIGS. 14A to 14F.

According to the user input, the first application and the first content may be executed (operation 1701). In particular, as described with reference to FIGS. 15A and 15B, the first application may be a phonebook application and the first content may be a contact number. Operation 1701 may correspond to FIG. 14A.

In order to search for content bound to the first content, the controller 101 may execute the CB FW (operation 1702).

An image for searching for the content bound to the first content may be displayed on the user interface 105 (operation 1703).

Operations 1702 and 1703 may correspond to FIG. 14B.

The user may touch, drag, and swipe an image for searching for the content that is bound to the first content (operation 1704). Operation 1704 may correspond to FIG. 14C.

Next, the CB FW may divide the screen of the user interface 105 (operation 1705). That is, the divided screen is activated on the user interface 105.

Next, the CB FW may display the first content in the first area of the divided screen, and display icons of applications that execute the content that is bound to the first content (operation 1706). The CB FW may select any one of the displayed icons and search for the bound content. Operations 1705 and 1706 may correspond to FIG. 14D.

A second application that corresponds to an icon selected according to the selection of the CB FW may be executed (operation 1707). The second application may be a default application. The default application may be an application that is executed by the CB FW. Then, the executed application may execute default bound content. As shown in FIG. 14D, the default application may be a gallery application, and the default bound content may be image content. As described above, an icon of an application bound to the default bound content may be displayed on the default bound content.

The user may select one of application icons shown on the first content (operation 1708). Referring to FIG. 14E, the selected application icon may be a video playing application icon. The user's selection may be transmitted to the CB FW.

Operations 1707 and 1708 may correspond to FIG. 14E.

The CB FW may drive a third application according to the received user's selection (operation 1709). Referring to FIG. 14F, the third application may be a video playing application.

The video playing application may play video content that is bound to the first content (operation 1710).

Operations 1709 and 1710 may correspond to FIG. 14F.

Figure 18:
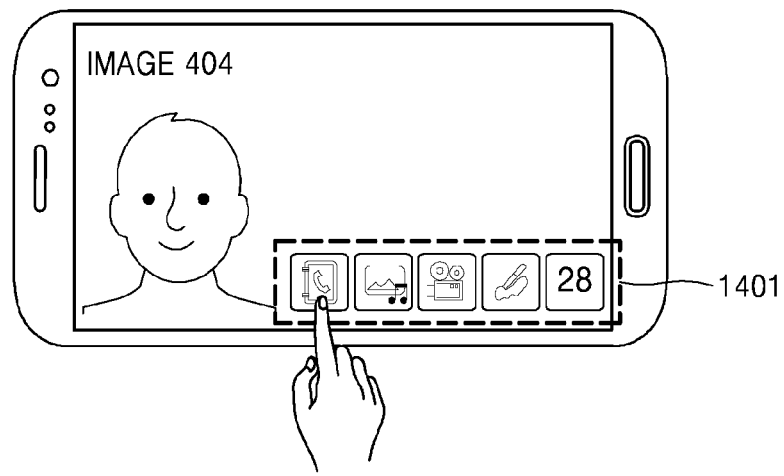
FIG. 18 is an exemplary diagram of a user input for displaying bound content, according to an embodiment.

FIG. 18 is an exemplary diagram of a user input for displaying bound content, according to an embodiment.

According to an embodiment, the user interface 105 may display image content 'image 404.' According to an embodiment, in order to search for the bound content, the user interface 105 may display images of applications that execute content that is bound to the 'image 404' as icons 1401. The user may select any one of the icons 1401 and search for the content that is bound to the 'image 404.'

Described below are examples of content that may be executed when the user selects an icon of an application.

When the user selects an icon of a music application, the music application may play a song sung by a person shown on an image or a song preferred by the person on the image.

When the user selects an icon of a video playing application, the video playing application may play video content that is recorded when an image has been captured. That is, when the 'image 404' is captured at someone's birthday party, the video playing application may play video content that has been recorded during the birthday party.

When the user selects an icon of a note application, the note application may execute note content bound to the 'image 404.' In particular, the bound note content may include a diary page written at the time when the 'image 404' was captured.

When the user selects an icon of a map application, the map application may execute map content that includes a location bound to the 'image 404.' In particular, the bound location may be a location where the 'image 404' has been captured.

When the user selects an icon of a gallery application, the gallery application may display images bound to the 'image 404.' The bound images may be captured in similar situations but at different days.

Figure 19A:
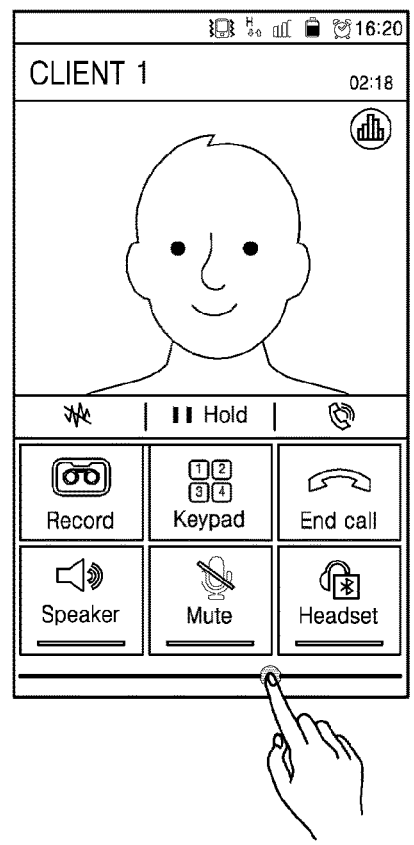
FIGS. 19A and 19B are exemplary diagrams of a user input for displaying bound content, according to an embodiment.
Figure 19B:
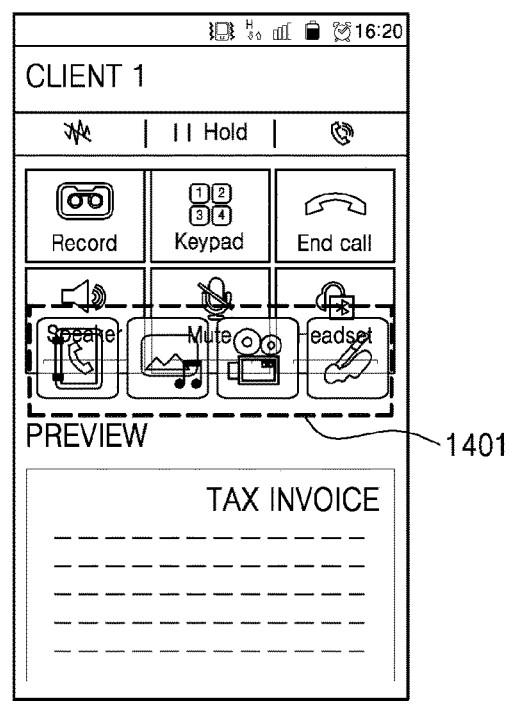

FIGS. 19A and 19B are exemplary diagrams of a user input for displaying bound content, according to an embodiment.

The user may search for content that is bound to the client 1 while calling the client 1. Referring to FIG. 19A, the user may select a line at a lower portion of a call screen and start searching for bound content. If there is no content that is bound to the client 1, the line may not be shown at the lower portion of the call screen.

Referring to FIG. 19B, the call screen may be reduced and shown in the first area, and the icons 1401 of applications that execute content bound to the client 1 may be displayed in the first area. The icons 1401 may be semi-transparently shown in the call screen of the first area. The user may select a note application. As a result, 'tax invoice' content received from the client 1 may be displayed in the second area.

Figure 20A:
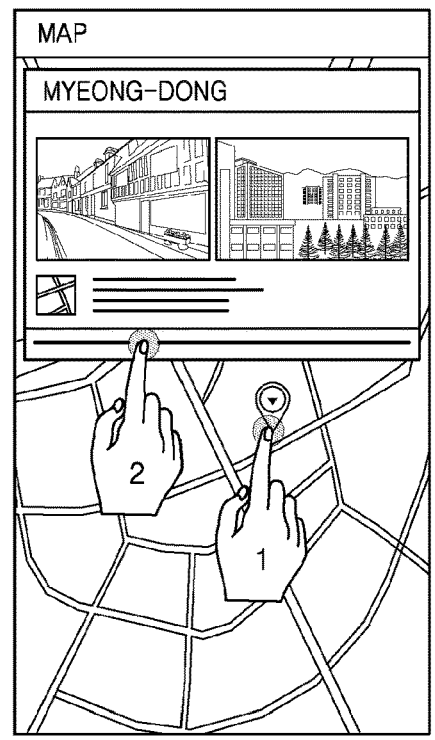
FIGS. 20A to 20C are exemplary diagrams of a user input for displaying bound content, according to an embodiment.
Figure 20B:
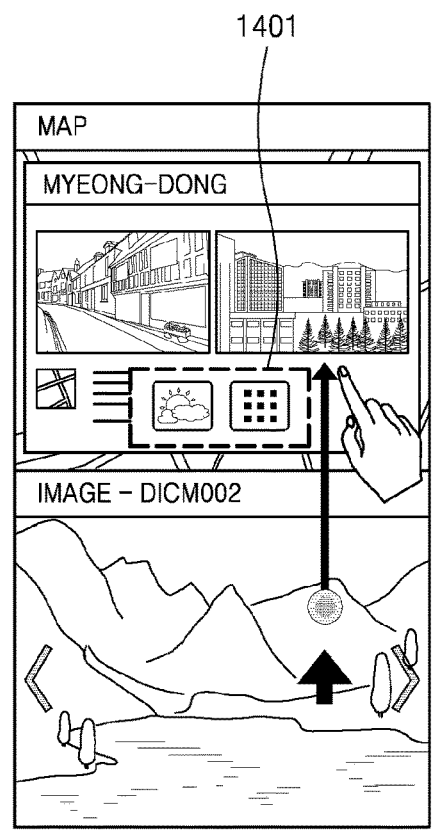
Figure 20C:
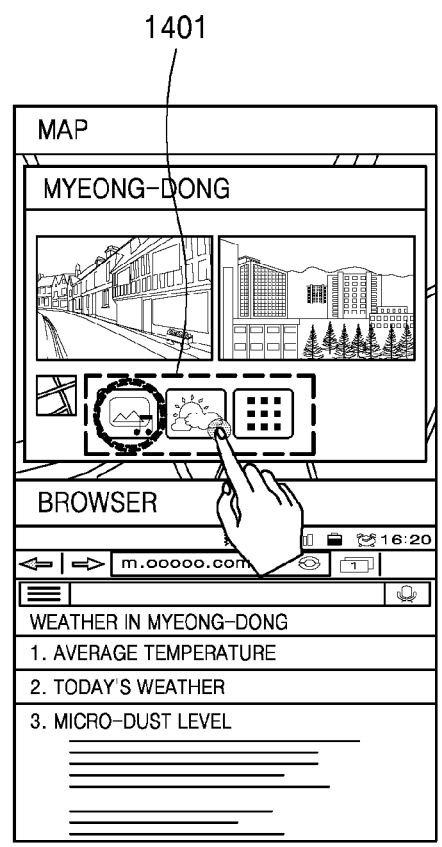

FIGS. 20A to 20C are exemplary diagrams of a user input for displaying bound content, according to an embodiment.

Referring to FIG. 20A, a screen of the user interface 105 displays map content that is executed by a map application. The user may select a certain location such as Myeong-dong on the map content (performed by a hand 1 in FIG. 20A). When the user selects Myeong-dong, content bound to Myeong-dong may be displayed. The user may select a line under the content bound to Myeong-dong (performed by a hand 2 in FIG. 20A)

According to an embodiment, the line being displayed under the content bound to Myeong-dong, indicates the presence of another content bound to the content bound to Myeong-dong. When the user selects the line under the content bound to Myeong-dong, the screen of the user interface 105 may be divided in to a first area and a second area.

Referring to FIG. 20B, the user may recognize the presence of the content bound to content that is already bound to Myeong-dong, based on application icons 1401 shown under the content bound to Myeong-dong. The application icons 1401 may include a weather application icon. Also, the application icons 1401 may include an application menu icon.

The user may search for content that may be bound to the content bound to Myeong-dong. Content DICM002 that is found may be displayed in the second area. The user may tap and drag or swipe the content DICM002 from the second area to the first area to bind the content DICM002 with the map content of Myeong-dong.

Referring to FIG. 20C, the user may recognize the presence of the content bound to content that is already bound to Myeong-dong, based on application icons 1401 shown under the content bound to Myeong-dong. Since image content bound to Myeong-dong has been added, the application icons 1401 may further include a gallery application icon.

The user may select the weather application icon and search for weather content of Myeong-dong.

Figure 21A:
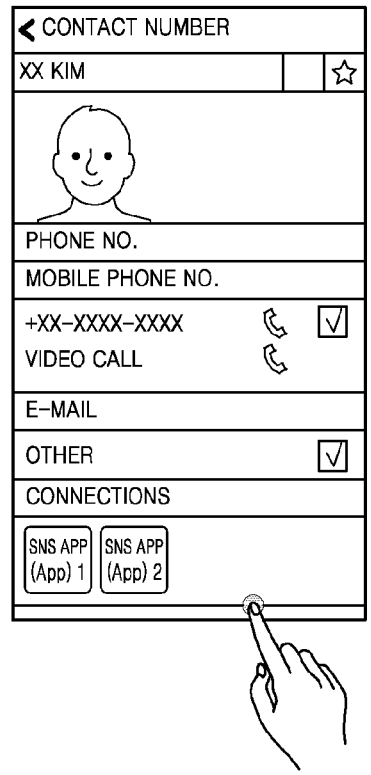
FIGS. 21A to 21C are exemplary diagrams of a user input for displaying bound content, according to an embodiment.
Figure 21B:
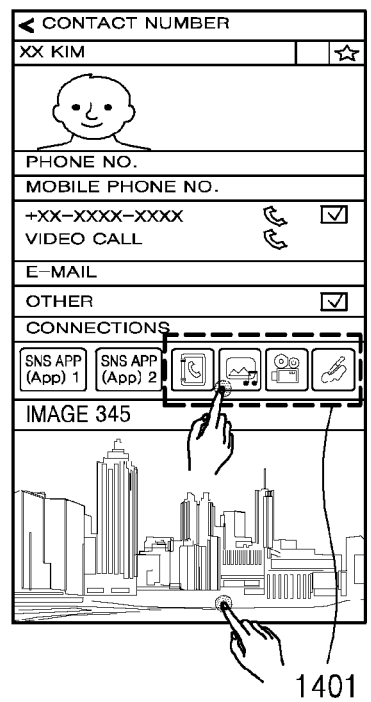
Figure 21C:
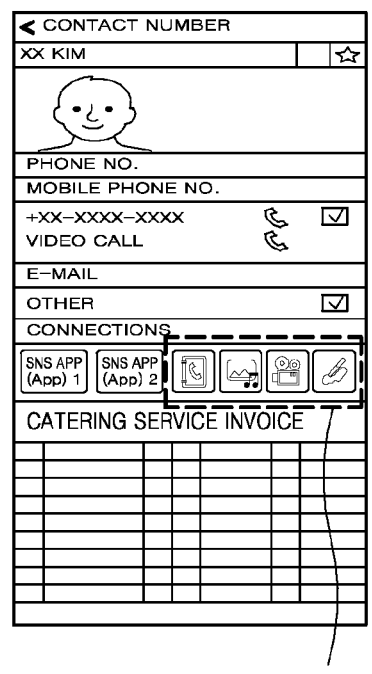

FIGS. 21A to 21C are exemplary diagrams of a user input for displaying bound content, according to an embodiment.

Description of FIG. 21A is omitted because FIG. 21A is the same as FIG. 14C.

Referring to FIG. 21B, the user may select any one of the application icons 1401 bound to first content. According to the user's selection, second content that is bound to the first content may be displayed in a second area. Referring to FIG. 21B, the second content may be 'image 345.'

Next, the user may touch or tap the second area.

Referring to FIG. 21C, when the user touches or taps the second area, third content that is bound to the second content may be displayed in the second area. The third content may be document content, for example, a catering service invoice. According to an embodiment, the third content bound to the second content may be searched for without finishing a first application.

Figure 22A:
FIGS. 22A and 22B are exemplary diagrams of a user input for displaying bound content, according to an embodiment.
Figure 22B:
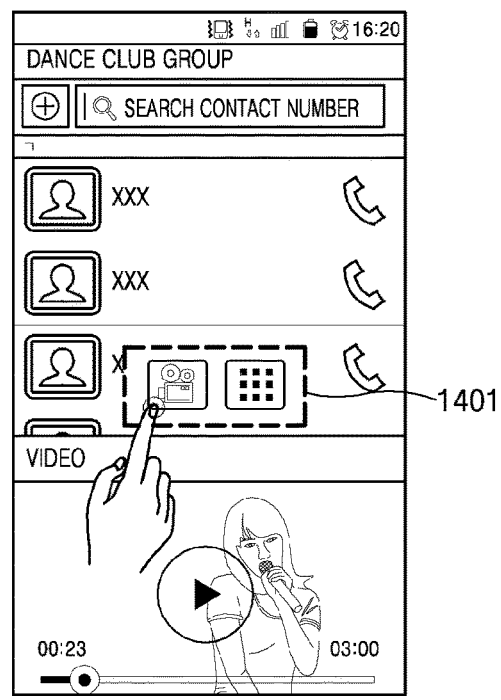

FIGS. 22A and 22B are exemplary diagrams of a user input for displaying bound content, according to an embodiment.

Referring to FIG. 22A, a screen of the user interface 105 may display content that is bound as a group by a phonebook application. In particular, displayed contact number content may be contact numbers of members of a dance club. As shown in FIGS. 22A and 22B, a group name of the displayed contact number content is 'DANCE CLUB GROUP.' As described above with reference to FIG. 16B, the contact numbers of the members of the dance club which are bound as a group may be displayed simultaneously as a list on the screen of the user interface 105.

At a lower portion of the screen of the user interface 105, an image indicating the presence of content that is bound to 'DANCE CLUB GROUP' may be displayed. The user may select the image indicating the presence of the bound content.

Referring to FIG. 22B, the screen of the user interface 105 may be divided. Also, the screen of the user interface 105 may display icons 1401 of applications that are bound to 'DANCE CLUB GROUP.' As shown in the drawing, content that is bound to 'DANCE CLUB GROUP' may be video content. Also, the user may select an application menu icon at a right side of a video playing application and search for content that is bound to 'DANCE CLUB GROUP' in other applications. When the user may select the video playing application icon, video content bound to 'DANCE CLUB GROUP' may be played in a second area.

FIGS. 23A to 23C, 24A, and 24B are exemplary diagrams of a user input for binding content, according to an embodiment.

FIGS. 23A to 23C, 24A, and 24B are specific embodiments of FIG. 11C.

Figure 23A:
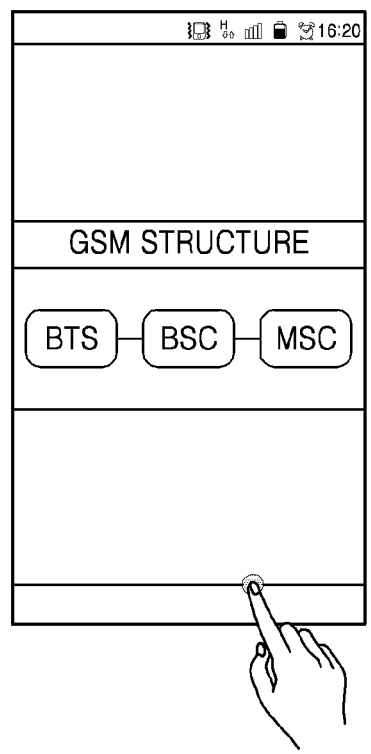
FIGS. 23A to 23C, 24A, and 24B are exemplary diagrams of a user input for binding content, according to an embodiment.

Referring to FIG. 23A, a screen of the user interface 105 may display first content and an image indicating the presence of content that is bound to the first content. The user may select the image indicating the presence of the content bound to the first content.

The first content may be presentation content about a structure of Global System for Mobile Communications (GSM), which is one of communication systems.

Figure 23B:
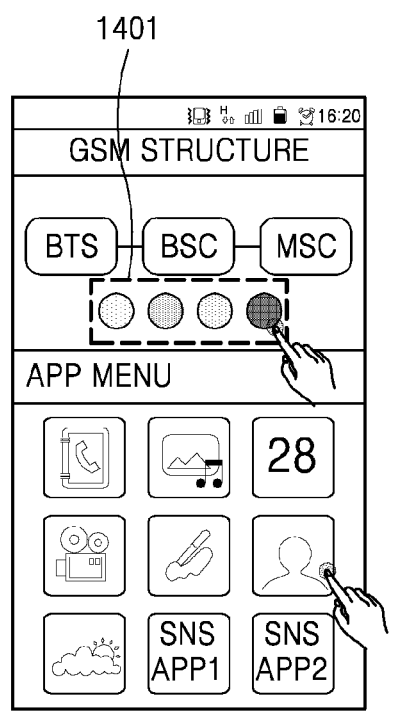

Referring to FIG. 23B, the screen may be divided according to a user's selection, and the first content may be displayed in a first area. Also, the first area may display icons 1401 of applications bound to the first content. A second area may display application icons. The application icons displayed in the second area may include all applications icons in the electronic device 100. The user may select an icon of a video playing application from among the displayed application icons, and execute the video playing application. The user may search for the content bound to the first content from among content of the video playing application.

Figure 23C:
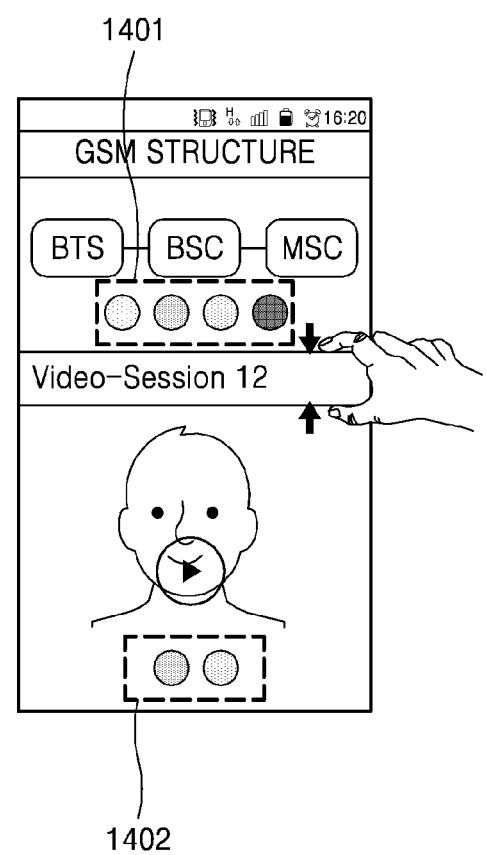

Referring to FIG. 23C, content found by the user (second content) may be displayed in the second area. As shown in the drawing, application icons 1402 that indicate the presence of content bound to the second content may be displayed in the second area.

The user may simultaneously select and pinch the first and second areas. The pinching may bind the first content to the second content. The pinching may bind the first content to the second content as a group.

Figure 24A:
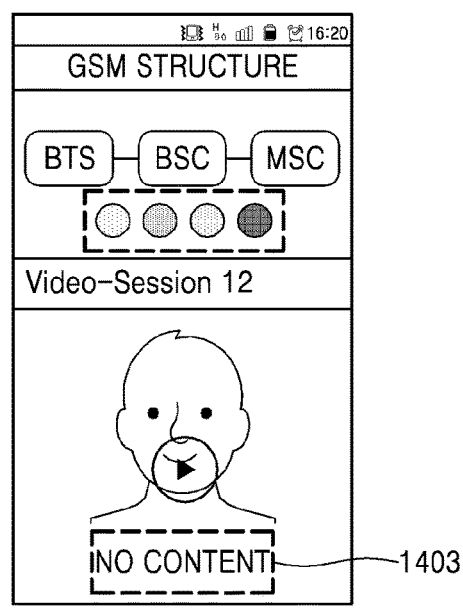

Referring to FIG. 24A, when the first content is bound to the second content, the icons 1402 indicating the presence of the content bound to the second content in the second area may disappear (operation 1403).

Figure 24B:
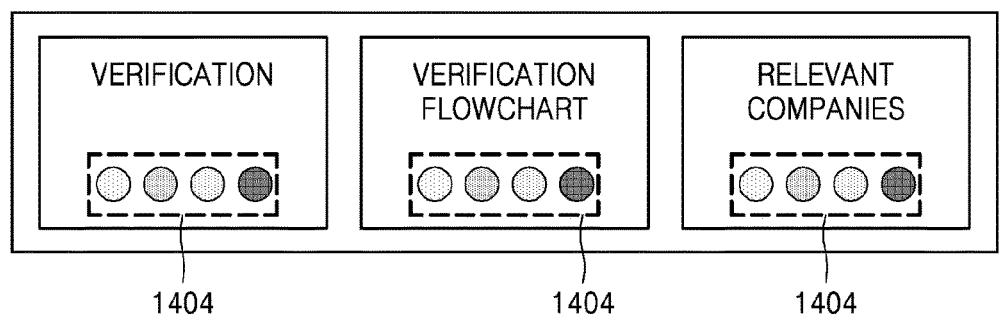

Referring to FIG. 24B, when the user binds the first content to the second content, content bound to the first content and content bound to the second content may be combined. That is, the combination of content bound to the first content and the second content may be data including a lecture note of verification of GSM, a verification flowchart note, and information of companies using GSM. As described with reference to FIGS. 9A and 9B, when the first content and the second content are bound as a group, the user may directly search for the second content from the combination of bound content. In particular, the user may search for the second content by selecting an icon 1401 of a bound application that is displayed on each piece of content.

FIGS. 25A to 25D are another embodiment of the embodiment shown in FIGS. 22A, 22B, 23A to 23C, 24A, and 24B.

Figure 25A:
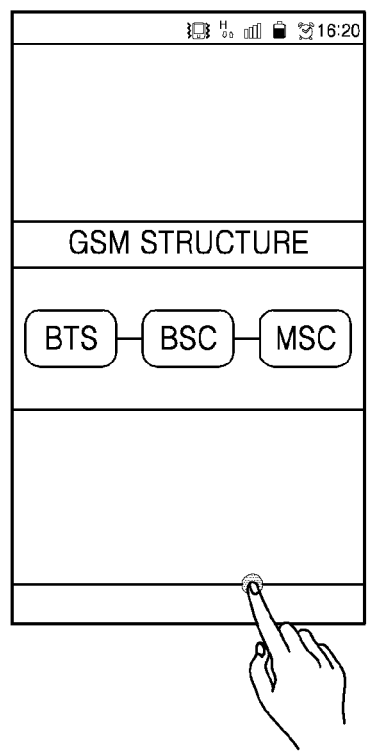
FIGS. 25A to 25D are another embodiment of the embodiment shown in FIGS. 22A, 22B, 23A to 23C, 24A, and 24B.
Figure 25B:
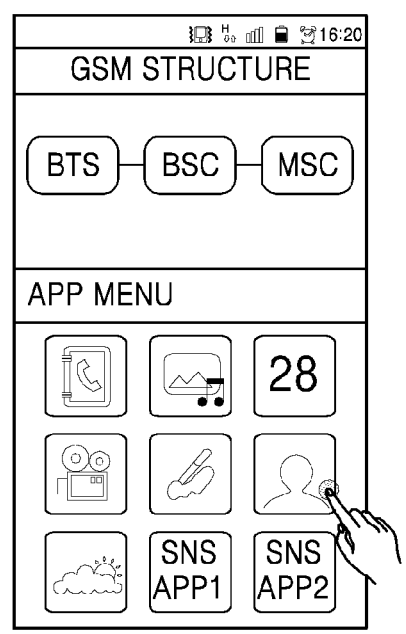

Descriptions of FIGS. 25A and 25B are omitted because 25A and 25B are the same as FIGS. 23A and 23B. However, the user may select a content group management application from among application icons.

Figure 25C:
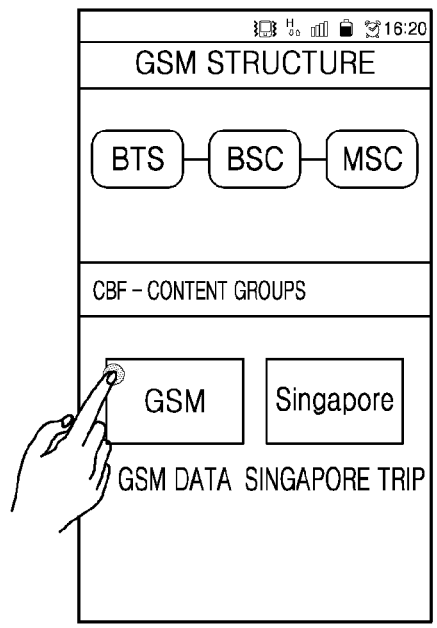

Referring to FIG. 25C, the content group management application may be executed according to the user's selection. The content group management application may include 'GSM DATA' group content and 'SINGAPORE TRIP' group content. The user may select the 'GSM DATA' group content that is bound to first content.

Figure 25D:
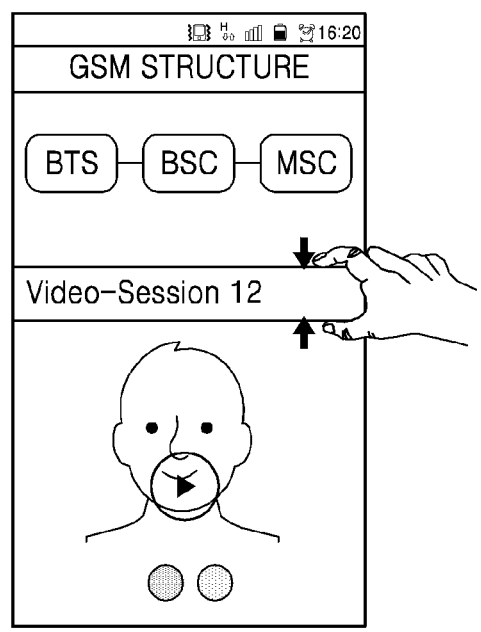

Referring to FIG. 25D, the user may execute second content that is bound to the first content in a second area. Then, the user may pinch a first area and the second area. Description of FIG. 25D will be omitted because FIG. 25D is the same as FIG. 23C.

Figure 26:
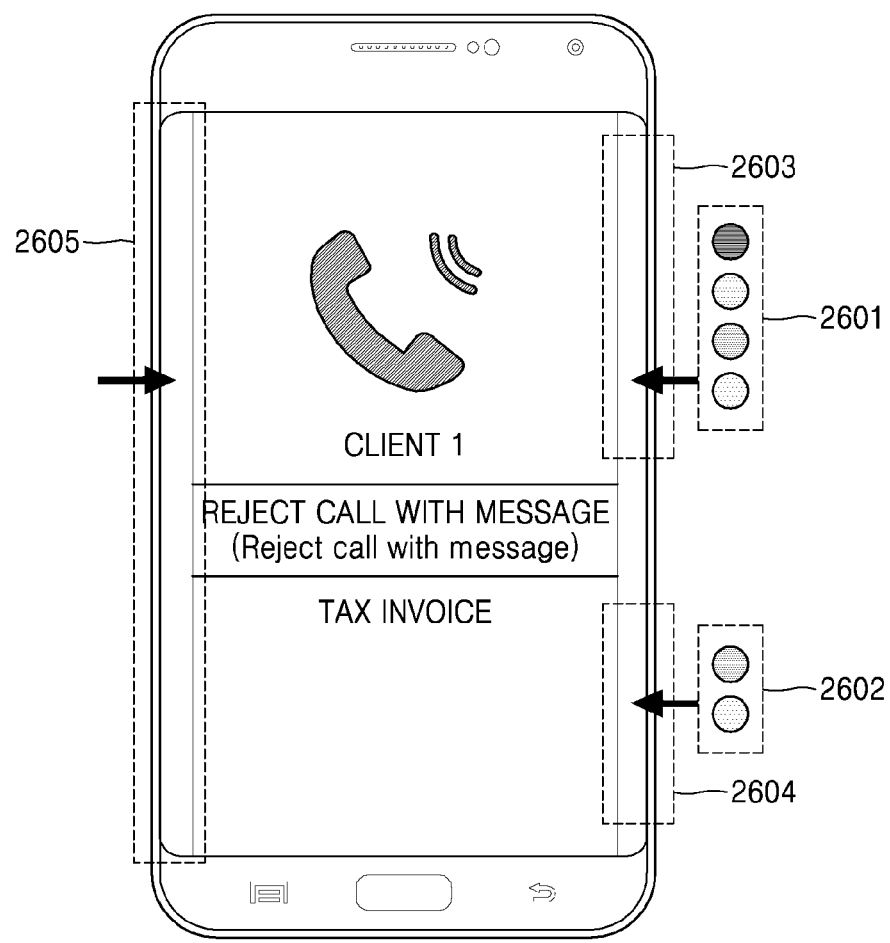
FIG. 26 is a user interface, according to an embodiment.

FIG. 26 is the user interface 105, according to an embodiment.

FIG. 26 shows an example in which the user interface 105 according to an embodiment is a touch screen with an edge screen. The edge screen of the user interface 105 is a different area from a first area showing first content and a second area showing second content, and the edge screen may be curved. Accordingly, the user may see content or an image shown on the edge screen from a side of the user interface 105.

Referring to FIG. 26, the edge screen of the user interface 105 may include areas 2603, 2604, and 2605. In this case, an icon 2601 of an application bound to the first content shown in the first area may be displayed in the area 2603. Also, an icon 2602 of an application bound to the second content shown in the second area may be displayed in the area 2604.

Also, the icon 2601 of the application bound to the first content and the icon 2602 of the application bound to the second content may be displayed in the area 2605.

Figure 27:
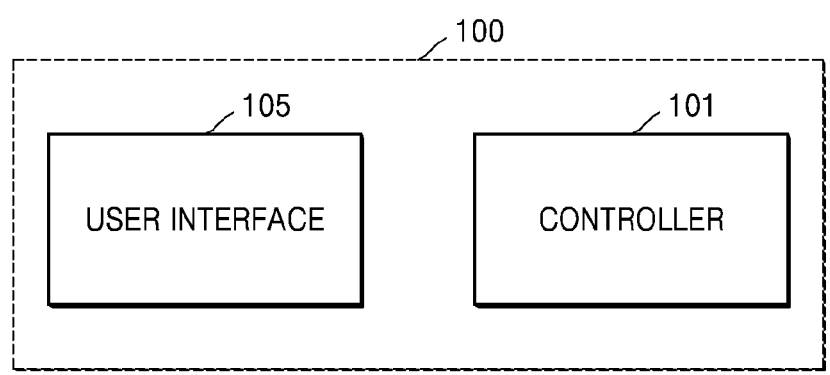
FIG. 27 is a block diagram of an electronic device for managing content, according to an embodiment.

FIG. 27 is a block diagram of an electronic device 100 for managing content, according to an embodiment. The electronic device 100 for managing content may include a controller 101 and a user interface 105.

The user interface 105 may display first content executed by a first application and second content executed by a second application, and receive a user input for binding the first content to the second content.

The controller 101 may determine a relationship between the first content and the second content according to the user input.

Also, when any one of the first content and the second content is executed, the user interface 105 according to an embodiment may display that the presence of content that is bound to the executed content.

The user interface 105 may receive a user input related to an image indicating the presence of the content that is bound to the executed content.

The controller 101 may execute the bound content according to the user input related to the image.

Figure 28:
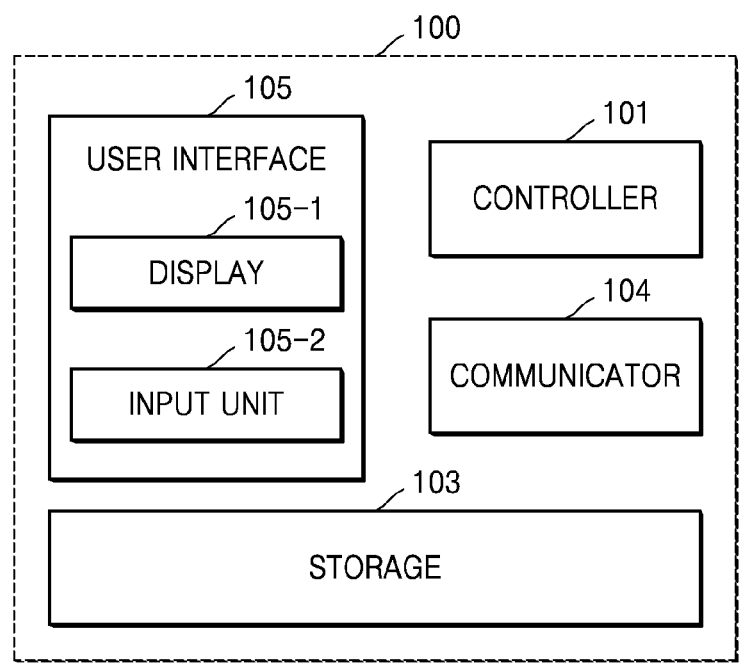
FIG. 28 is a block diagram of an electronic device for managing content, according to an embodiment.

FIG. 28 is a block diagram of an electronic device 100 for managing content, according to an embodiment. The electronic device 100 for managing content may include a controller 101, a storage 103, a communicator 104, and a user interface 105.

The controller 101 and the storage 103 are the same as those in FIGS. 1 and 27.

The communicator 104 may for communication with an external device (not shown) and an external server (not shown), and transmit and receive data to and from the external device and the external server. Although FIG. 28 shows that the electronic device 100 includes the communicator 104, as shown in FIGS. 1 and 27, the electronic device 100 may not include the communicator 104 according to embodiments.

The user interface 105 according to an embodiment may include a display 105-1 and an input unit 105-2. The user interface 105 may be configured as a combination of the display 105-1 and the input unit 105-2 as a touch screen.

The user interface 105 may display an image indicating the presence of bound content or an image of an application executing the bound content on any one of executed content.

When a content management application is executed on a screen displaying first content, the user interface 105 may display the first content on an area of the screen and display second content to be bound to the first content on another area.

The controller 101 may identify a relationship between the first content and the second content, and when the first content is not bound to the second content based on the identification, the controller 101 may set the relationship between the first content and the second content.

The relationship between the first content and the second content may be set based on identifiers and content types of the first content and the second content.

A user input for binding the first content to the second content may include simultaneously pinching the areas that show the first content and the second content.

The user input for binding the first content to the second content may include swiping from the area showing the second content to the area showing the first content.

The user interface 105 may display bound content on an area created by size reducing and displaying any one of executed content.

The controller 101 may receive an operation of swiping from an area showing the bound content to an area showing the first content.

Figure 29:
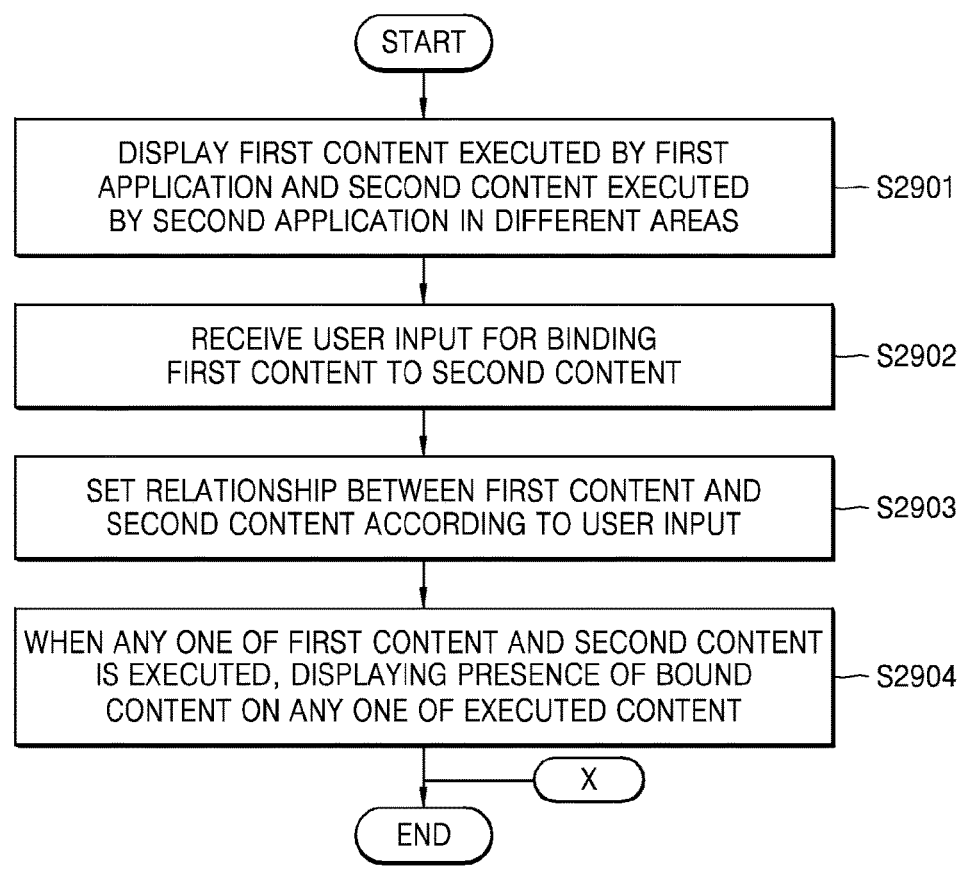
FIGS. 29 and 30 are flowcharts of methods of managing content, according to an embodiment.
Figure 30:
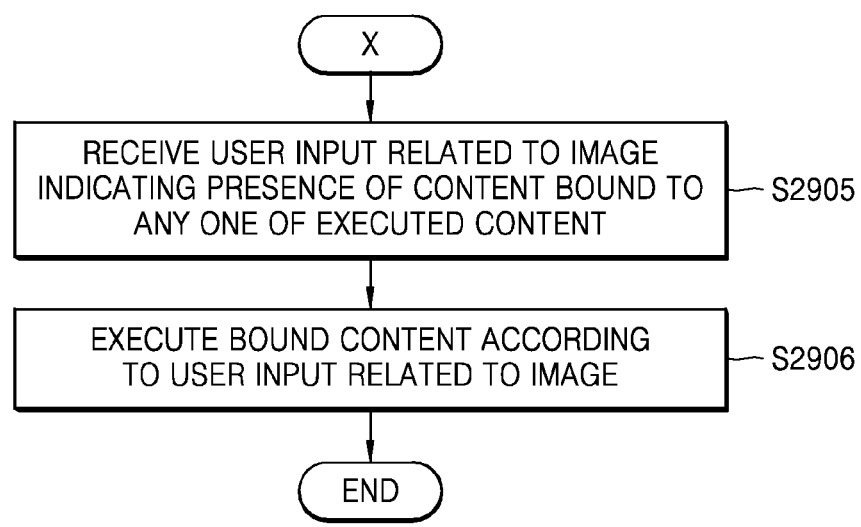

Also, the user interface 105 may display that the bound content is unbound from the first content FIGS. 29 and 30 are flowcharts of methods of managing content, according to an embodiment.

In particular, FIG. 29 is a flowchart of a method of creating bound content by binding content, and FIG. 30 is a flowchart of a method of executing the bound content.

Referring to FIG. 29, the electronic device 100 may display first content executed by a first application and second content executed by a second application in different areas (S2901). When a content management application is executed on a screen executing the first content, the electronic device 100 may divide the screen, display the first content on an area of the divided screen and display second content to be bound to the first content on another area of the divided screen.

Next, the electronic device 100 may receive a user input for binding the first content to the second content (S2902). The electronic device 100 may receive an operation of simultaneously pinching an area showing the first content and an area showing the second content. Also, the electronic device 100 may swipe or drag the area showing the second content to the area showing the first content.

Next, according to the user input, the electronic device 100 may set a relationship between the first content and the second content (S2903). The electronic device 100 may identify the relationship between the first content and the second content, and when the first content is not bound the second content based on the identification, the electronic device 100 may set the relationship between the first content and the second content. The electronic device 100 may set the relationship between the first content and the second content based on respective IDs and content types of the first content and the second content.

Thereafter, while any one of the first content and the second content is executed, the electronic device 100 may display the presence of bound content on any one of executed content (S2904). The electronic device 100 may display an image indicating the presence of bound content or an image of an application executing the bound content on any one of executed content.

Referring to FIG. 30, the electronic device 100 may receive a user input related to an image indicating the presence of content bound to any one of executed content (S2905).

The electronic device 100 may display the bound content on an area created by size reducing and displaying any content.

The electronic device 100 may execute the bound content according to the user input related to the image (S2906). The electronic device 100 according to an embodiment may receive an operation of swiping from an area showing the bound content to an area showing the first content. Then, the electronic device 100 may display that the bound content is unbound from the first content.

The aforementioned method of managing content performed by an electronic device may be created as computer-executable programs and implemented in a general digital computer executing the programs by using a computer-readable recording medium. The computer-readable medium may include recording media, such as magnetic storage media (e.g., ROM, floppy disks, or hard disks) and optical recording media (e.g., CD-ROMs, or DVDs).

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device for managing content, the electronic device comprising:
    a user interface configured to display first content executed by a first application and second content executed by a second application, and receive a user input for binding the first content to the second content, wherein a structure of the binding is determined based on the user input; and
    at least one processor configured to:
        set a relationship between the first content and the second content according to the user input,
        when the first content is executed, control the user interface to display presence of the second content bound to the executed first content, and
        control the user interface to reduce a size of the executed first content and display the executed first content on an area of a screen while displaying the bound second content on another area of the screen, wherein the first content and the second content are displayed according to the determined structure of the binding.

2. The electronic device of claim 1, wherein the user interface is configured to display an image indicating the presence of the bound second content or an image of an application executing the bound second content, on the executed first content.

3. The electronic device of claim 1, wherein, when a content management application is executed on a screen showing the first content, the user interface is configured to display the first content on an area of the screen and display the second content that is to be bound to the first content on another area of the screen.

4. The electronic device of claim 1, wherein the at least one processor is configured to identify the relationship between the first content and the second content, and when the first content is not bound to the second content based on the identification, the at least one processor is configured to set the relationship between the first content and the second content.

5. The electronic device of claim 1, wherein the relationship between the first content and the second content is set based on respective identifiers and content types of the first content and the second content.

6. The electronic device of claim 1, wherein the user input for binding the first content to the second content comprises an operation of simultaneously pinching an area showing the first content and an area showing the second content.

7. The electronic device of claim 1, wherein the user input for binding the first content to the second content comprises an operation of swiping from an area showing the second content to an area showing the first content.

8. The electronic device of claim 1, wherein the user interface is configured to receive a user input related to an image indicating the presence of second content bound to the executed first content, and
    the at least one processor is configured to execute the bound second content according to the user input related to the image.

9. The electronic device of claim 8, wherein the user interface is configured to receive an operation of swiping from an area showing the bound second content to an area showing the first content and display an indication that the bound second content is unbound from the first content.

10. The electronic device of claim 1, wherein the user interface is further configured to reduce the size of the executed first content and display the executed first content on a top portion while displaying the bound second content below the executed first content.

11. The electronic device of claim 1, wherein the structure of the binding is either nested binding or group binding.

12. A method of managing content, performed by an electronic device, the method comprising:
    displaying first content executed by a first application and second content executed by a second application;
    receiving a user input for binding the first content to the second content, wherein a structure of the binding is determined based on the user input;
    setting a relationship between the first content and the second content according to the user input; and
    displaying, when the first content is executed, presence of the second content bound to the executed first content; and
    reducing a size of the executed first content and displaying the executed first content on an area of a screen while displaying the bound second content on another area of the screen, wherein the first content and the second content are displayed according to the determined structure of the binding.

13. The method of claim 12, wherein the displaying of the presence of the bound second content comprises displaying an image indicating the presence of the bound second content or an image of an application executing the bound second content, on the executed first content.

14. The method of claim 12, further comprising dividing, when a content management application is executed on a screen showing the first content, the screen,
    wherein the displaying of the first content comprises displaying the first content on an area of the screen and displaying the second content that is to be bound to the first content on another area of the screen.

15. The method of claim 12, wherein the setting comprises identifying the relationship between the first content and the second content, and when the first content is not bound to the second content based on the identification, setting the relationship between the first content and the second content.

16. The method of claim 12, wherein the setting comprises setting the relationship between the first content and the second content based on respective identifiers and content types of the first content and the second content.

17. The method of claim 12, wherein the receiving of the user input comprises receiving an operation of simultaneously pinching an area showing the first content and an area showing the second content.

18. The method of claim 12, wherein the receiving of the user input comprises an operation of swiping from an area showing the second content to an area showing the first content.

19. The method of claim 12, further comprising:
receiving a user input related to an image indicating the presence of the second content bound to the executed first content; and
executing the bound second content according to the user input related to the image.

20. The method of claim 12, wherein the reducing and displaying comprises reducing the size of the executed first content and displaying the executed first content on a top portion while displaying the bound second content below the executed first content.

21. A computer program product comprising a computer readable storage medium having a computer readable program stored therein, wherein the computer readable program, when executed on a computing device, causes the computing device to:
display, by at least one processor, first content executed by a first application and second content executed by a second application;
receive, by the at least one processor, a user input for binding the first content to the second content, wherein a structure of the binding is determined based on the user input;
set, by the at least one processor, a relationship between the first content and the second content according to the user input; and
display, by the at least one processor, when the first content is executed, presence of the second content bound to the executed first content; and
reduce, by the at least one processor, a size of the executed first content and display the executed first content on an area of a screen while displaying the bound second content on another area of the screen,
wherein the first content and the second content are displayed according to the determined structure of the binding.

* * * * *